(12) United States Patent
Miyazaki et al.

(10) Patent No.: US 8,310,228 B2
(45) Date of Patent: Nov. 13, 2012

(54) RESOLVER

(75) Inventors: Hiroaki Miyazaki, Ichinomiya (JP);
Takehide Nakamura, Handa (JP);
Tomoaki Inoue, Nagoya (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 421 days.

(21) Appl. No.: 12/591,042

(22) Filed: Nov. 5, 2009

(65) Prior Publication Data
US 2010/0117632 A1 May 13, 2010

(30) Foreign Application Priority Data

Nov. 12, 2008 (JP) ................ 2008-290234
Nov. 25, 2008 (JP) ................ 2008-299722
Dec. 25, 2008 (JP) ................ 2008-329813

(51) Int. Cl.
*G01B 7/30* (2006.01)
(52) U.S. Cl. .............. 324/207.25; 324/207.17; 318/605; 310/216.004
(58) Field of Classification Search .......... None
See application file for complete search history.

(56) References Cited

U.S. PATENT DOCUMENTS

| | | | |
|---|---|---|---|
| 4,223,300 A | 9/1980 | Wiklund | |
| 5,150,115 A * | 9/1992 | deJong et al. | ............ 340/870.31 |
| 6,239,571 B1 * | 5/2001 | Shimahara | ..................... 318/605 |
| 6,628,038 B1 * | 9/2003 | Shikayama et al. | .......... 310/268 |
| 2009/0108836 A1 * | 4/2009 | Nakamura | ................ 324/207.17 |
| 2009/0246358 A1 * | 10/2009 | Winkel | ........................ 427/98.5 |

FOREIGN PATENT DOCUMENTS

| | | |
|---|---|---|
| CH | 637 250 A5 | 7/1983 |
| GB | 840 099 A | 7/1960 |
| JP | A-61-128400 | 6/1986 |
| JP | A-5-312590 | 11/1993 |
| JP | A-7-211537 | 8/1995 |
| JP | A-8-292066 | 11/1996 |
| JP | A-2002-78308 | 3/2002 |
| JP | A-2005-116676 | 4/2005 |
| JP | A-2006-81269 | 3/2006 |
| JP | A-2006-162577 | 6/2006 |
| JP | A-2006-208966 | 8/2006 |
| JP | A-2007-124757 | 5/2007 |
| JP | A-2007-225588 | 9/2007 |
| JP | A-2008-197046 | 8/2008 |

OTHER PUBLICATIONS

Office Action issued in corresponding German Patent Application No. 10 2009 052 765.6-52 dated Jan. 21, 2011 (with translation).
May 8, 2012 Japanese Office Action issued in Japanese Patent Application No. 2008-290234 (with English-language translation).
May 8, 2012 Japanese Office Action issued in Japanese Patent Application No. 2008-329813 (with English-language translation).

* cited by examiner

*Primary Examiner* — Minh N Tang
(74) *Attorney, Agent, or Firm* — Oliff & Berridge, PLC

(57) ABSTRACT

A resolver includes a disc-shaped rotor provided with a detection coil pattern formed in flat shape and a stator formed in flat plate shape placed to concentrically fact the rotor in an axial direction and configured such that a planar first excitation coil pattern to which a cosine wave is supplied and a planar second excitation coil pattern to which a sine wave is supplied, the first and the second patterns being laminated. The first and second excitation coil patterns are placed to face the detection coil pattern. An insulation layer is formed with insulating coating material between the first and second excitation coil patterns.

12 Claims, 24 Drawing Sheets

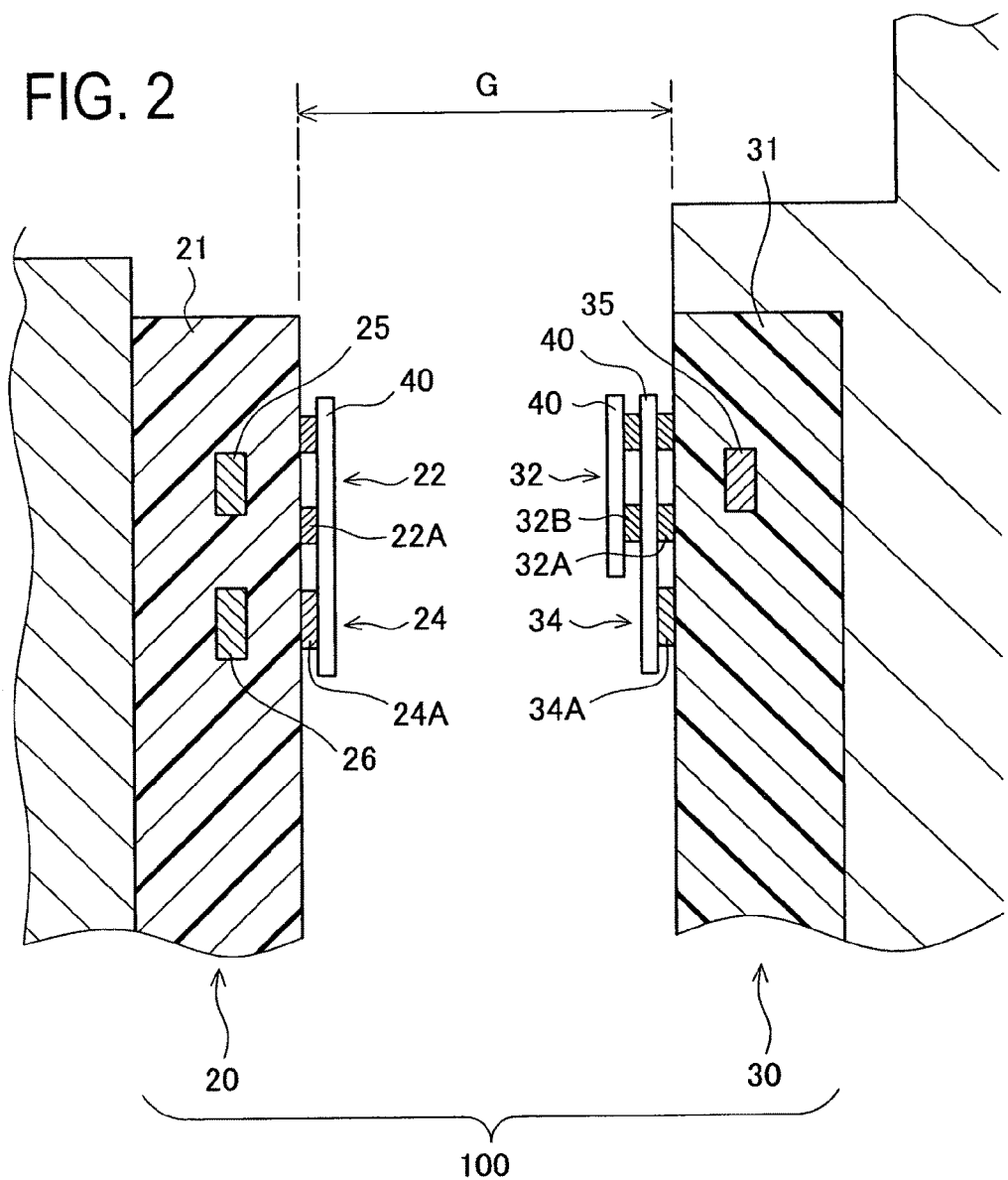

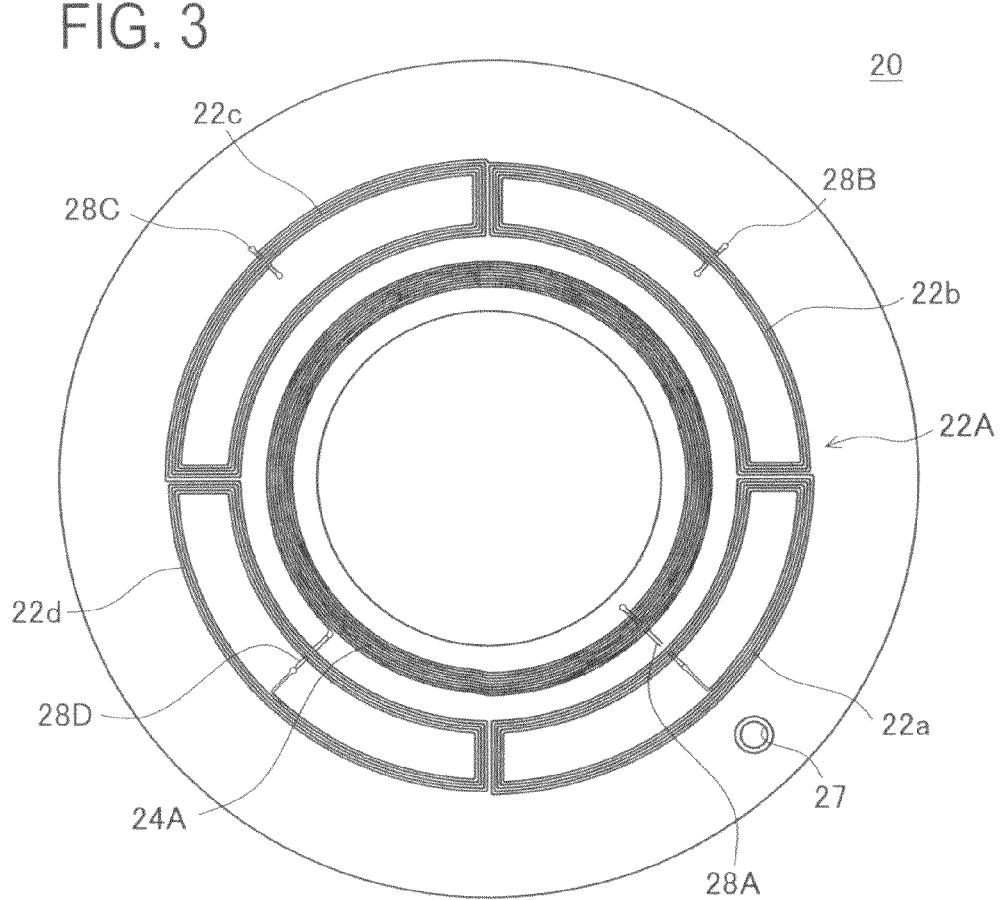

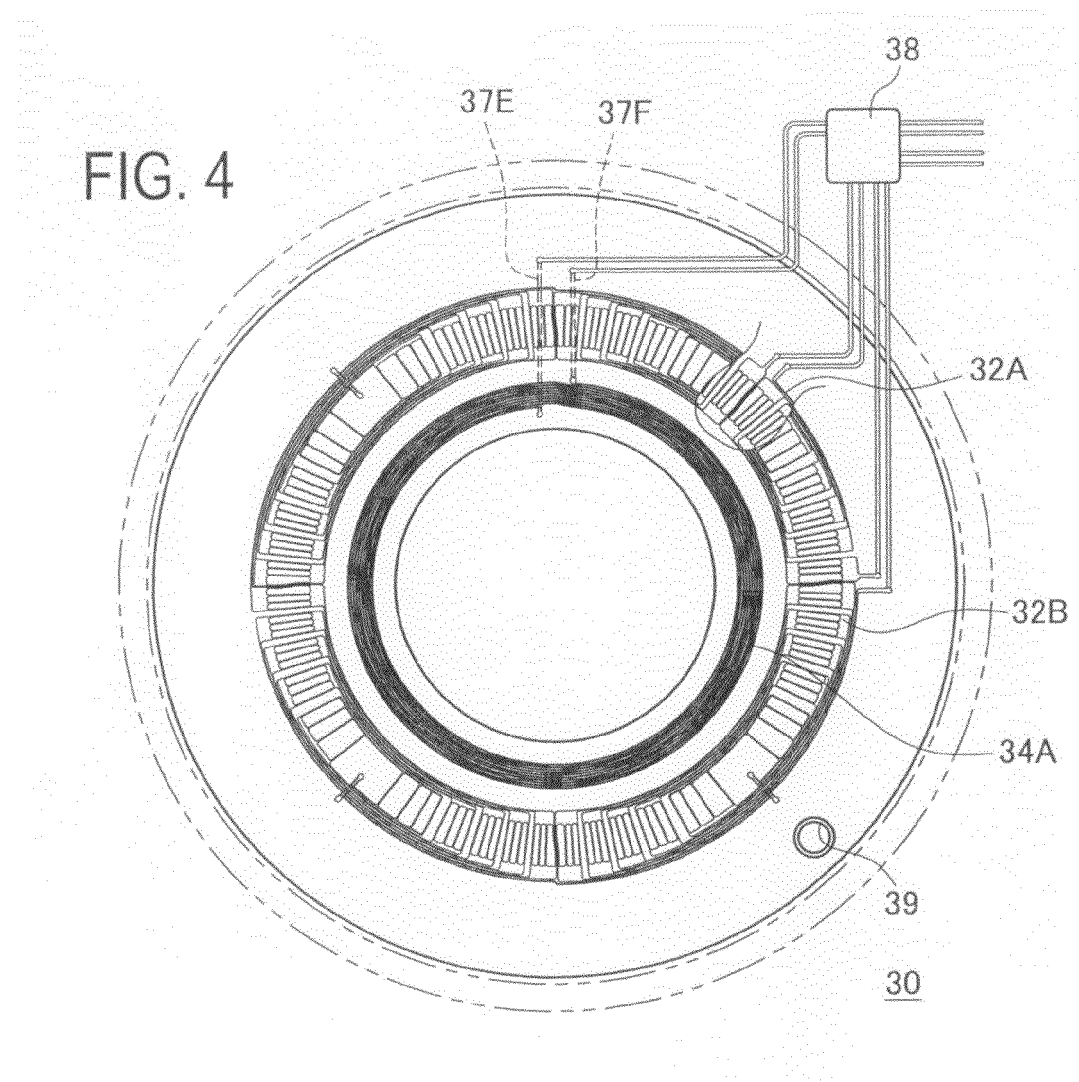

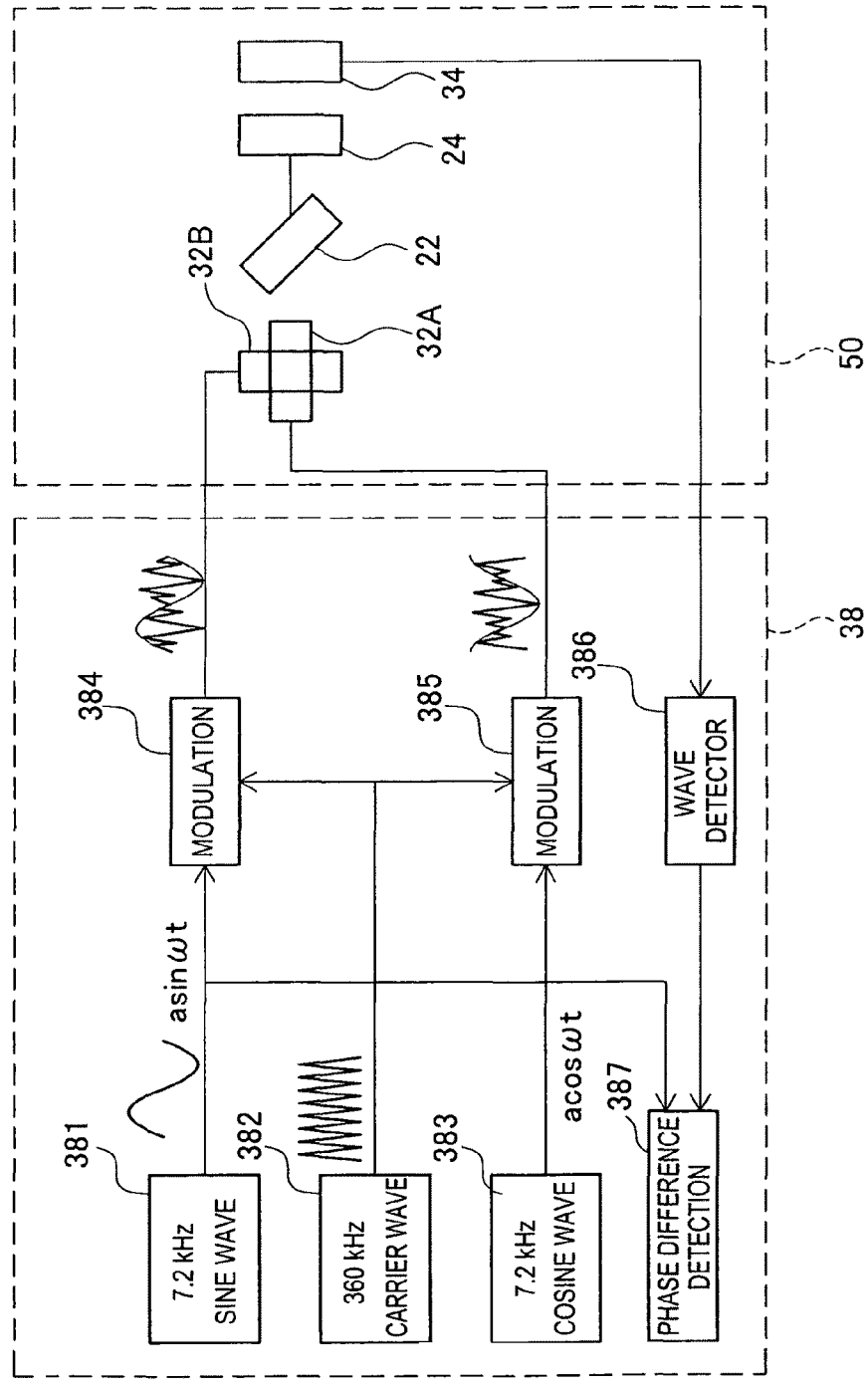

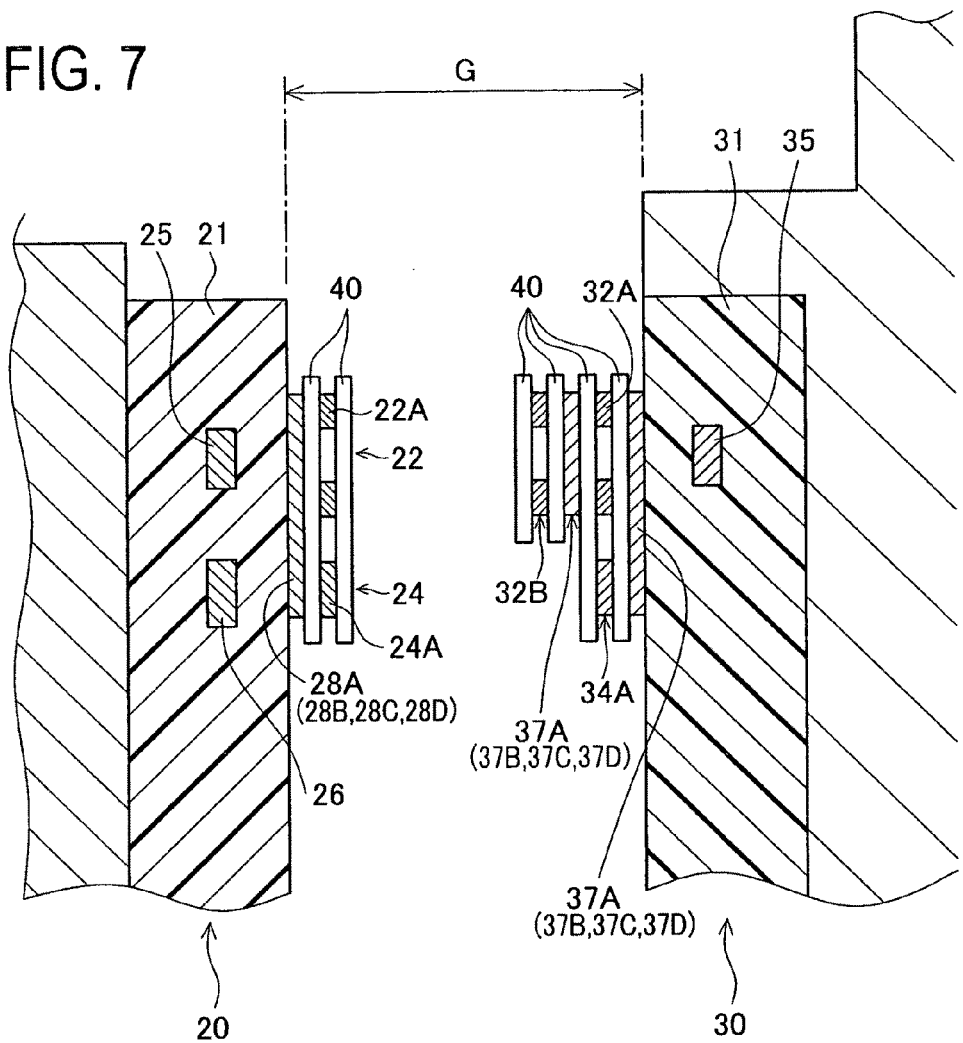

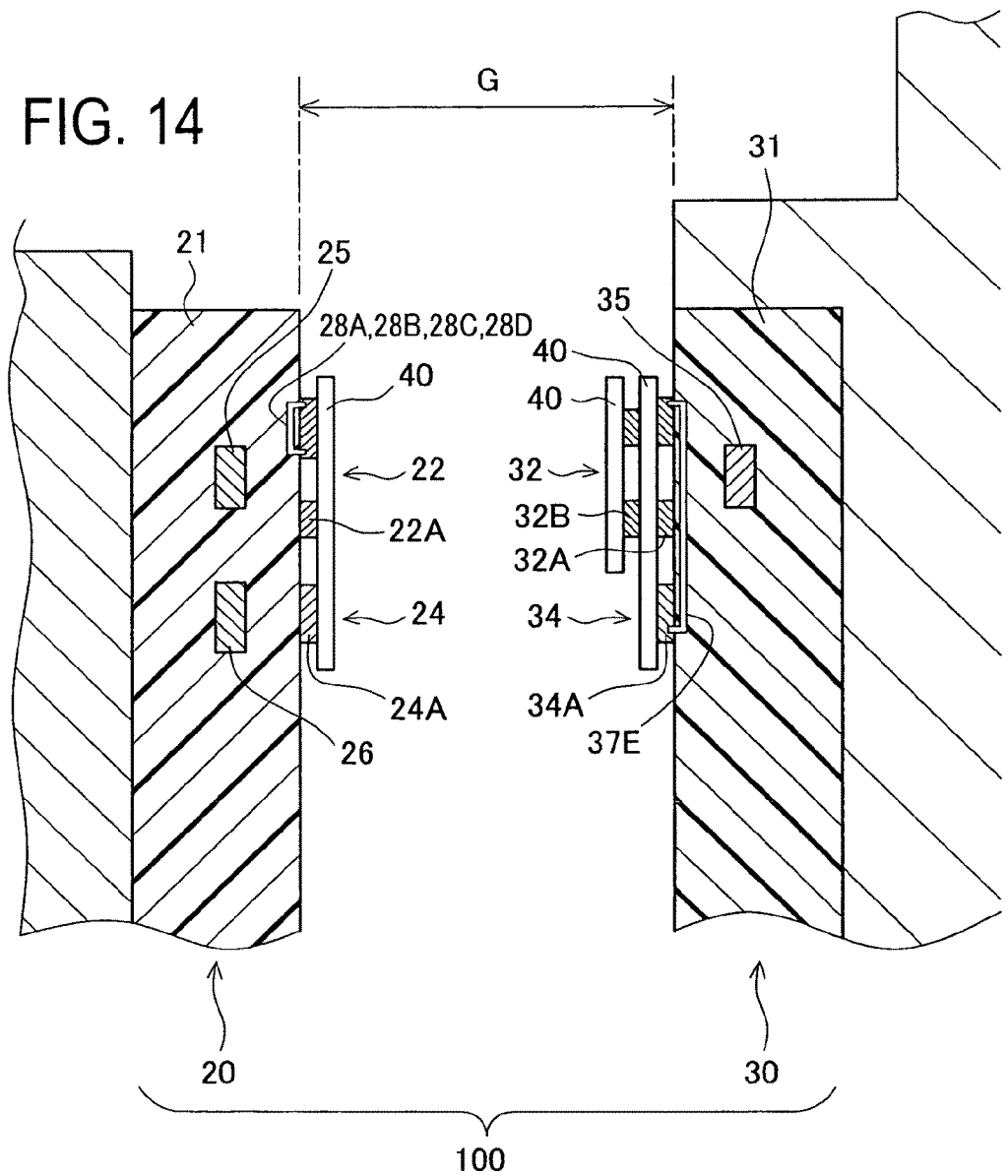

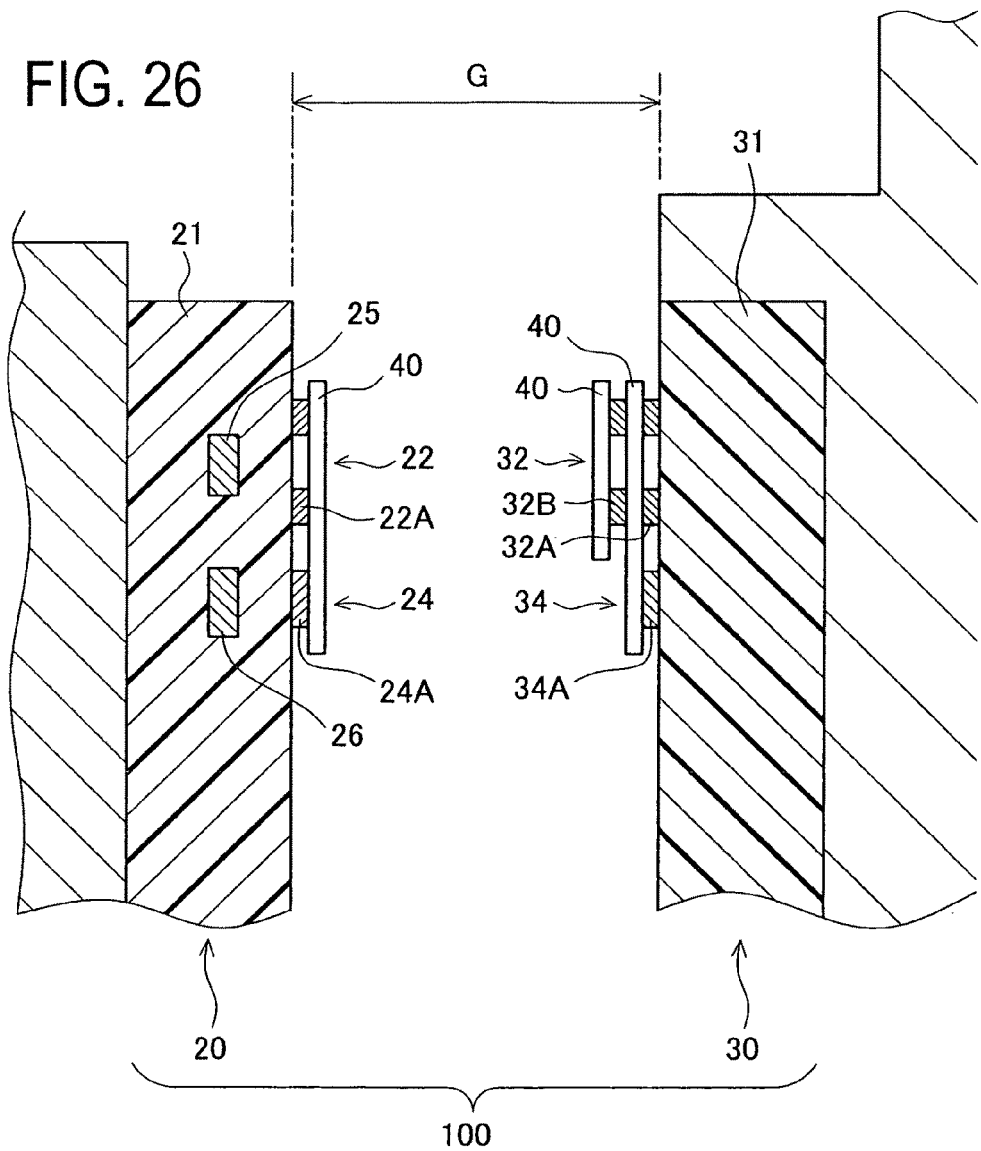

RESOLVER

CROSS-REFERENCE TO RELATED APPLICATIONS

This application is based upon and claims the benefit of priority from each of the prior Japanese Patent Applications No. 2008-290234 filed on Nov. 12, 2008, No. 2008-299722 filed on Nov. 25, 2008, and No. 2008-329813 filed on Dec. 25, 2008, the entire contents of which are incorporated herein by reference.

TECHNICAL FIELD

The present invention relates to a resolver to be used for detecting rotation angle of an output shaft of a vehicle motor.

BACKGROUND ART

As for a hybrid electric vehicle and an electric vehicle, a high-power brushless motor is used. Furthermore, a higher power motor will be expected. To control the brushless motor of a hybrid electric vehicle, it is necessary to accurately ascertain the rotation angle of an output shaft of the motor. This is because the rotation position (angle) of a rotor needs to be correctly ascertained in order to control switching of energization of coils of a stator.

Accordingly, the motor preferably includes a resolver to accurately detect the angle. Such resolver used in a drive mechanism of a vehicle is required to provide high accuracy in addition to environment resistance because of the high number of revolution of the drive mechanism. As with other in-vehicle components, the resolver is also demanded to achieve size reduction and cost reduction.

For increasing the accuracy of the resolver, a method using "skew" as disclosed in Patent Literature 1 (JP 5 (1993)-312590A) is conceivable. Specifically, in the prior art section of Patent Literature 1 for preventing distortion of a sine wave output from a magnetic resolver, there are disclosed a method of changing magnetic pole pitches of a rotor core and a stator core and a skew method of placing a stator core in an oblique position with respect to a rotor core.

On the other hand, a printed circuit has been known to reduce the size of a resolver. Patent Literature 2 (JP 7 (1995)-211537A) discloses that a pattern pitch in an arranging direction of a sheet coil to be provided on a base plate is adjusted to an irregular pitch, thereby preventing a higher harmonic wave from overlapping an electromotive waveform to enhance detection accuracy.

SUMMARY OF INVENTION

Technical Problem

However, Patent literatures 1 and 2 have the following disadvantages. Specifically, from the viewpoint of cost reduction of the resolver, the use of the spiral coils is undesirable because such configuration inevitably requires a winding process during manufacture. Cost reduction is therefore not easily realized.

The use of windings additionally requires a process of winding a wire on a bobbin and a process of mounting a coil and increases the number of resolver components. This is imperative to the cost reduction. The coil also needs a certain degree of thickness and hence thickness reduction is also difficult.

On the other hand, in the case of adopting the configuration disclosed in Patent literature 2, the use of a sheet coil can realize thickness reduction. The sheet coil is often formed by a method achieved by drawing a printed pattern on a copper plate placed on a base plate or substrate, forming a necessary pattern by etching, and further forming an insulation layer thereon. To produce a multilayer coil, such base plates are bonded together later. As above, several processes are required and therefore cost reduction could not be realized.

The present invention has been made to solve the above problems and has a purpose to provide a thin-shaped low-cost resolver.

Solution to Problem (1) To achieve the above purpose, one aspect of the invention provides a resolver comprising: a disc-shaped rotor provided with a tertiary coil formed in flat shape; and a stator placed to concentrically face the rotor in an axial direction, the stator being formed in flat plate shape configured such that a planar primary coil to which a cosine wave is supplied and a planar secondary coil to which a sine wave is supplied are laminated, wherein the primary and secondary coils are placed to face the tertiary coil, and an insulation layer made of an insulating coating material is provided between the primary and secondary coils.

(2) Another aspect of the invention provides a resolver comprising: a body of a rotor or a stator having an end face on which a planar coil is formed; and a connecting wire provided in the body and connected to the planar coil, wherein the end face of the body is provided with a recess around an end portion of the connecting wire to protrude from the body.

(3) Furthermore, another aspect of the invention provides a resolver comprising an excitation coil formed in flat plate shape and a detection coil formed in flat plate shape, the excitation coil and the detection coil being placed to face each other in spaced relation and to be movable relatively, the detection coil or the excitation coil is formed of at least two or more planar coils connected in parallel.

Advantageous Effects of Invention

According to the configuration (1), the primary coil to which a cosine wave is supplied and the secondary coil to which a sine wave is supplied are placed one on the other to form the excitation coil. The use of the electrically insulating coating material to form the insulation layer required to be provided between the primary coil and the secondary coil can achieve cost reduction.

For instance, the insulating coating material is applied by ink jet to draw the insulation layer and burned to form the insulation layer. Since the insulation layer is formed as above, the thin-shaped resolver can be produced and the number of processes can be reduced, thereby reducing cost.

According to the configuration (2), the end portion of the connecting wire is placed to protrude from the body and the recess is provided around the connecting wire end portion. In the case of using solder or the like for connection, the solder or the like stays in the recess to enhance electrical connecting strength with the connecting wire. Since the recess is provided around the connecting wire end portion, it is also possible to prevent leakage of solder or the like. This can achieve inexpensive and reliable wire connection between the coil and the connecting wire.

According to the configuration (3), at least one of the detection coil and the excitation coil is constituted of a plurality of planar coils connected in parallel, so that the performance can be ensured without causing a voltage reduction per one coil. For instance, when the magnetic field output from the excitation side is to be detected by the detection coil, the detection coil can produce sufficient ampere turns because the coils forming the detection coil are connected in parallel.

Accordingly, the coils forming the circuit can be made of a material having larger resistance than copper foil. For instance, if a coil is formed with conductive ink to reduce cost, the coil could not have sufficient thickness as compared with the copper foil, resulting in an increase in resistance. Even in such a case, the parallel connection of the coils forming the detection coil or the coils forming the excitation coil can provide sufficient ampere turns, thereby ensuring the performance of the resolver.

BRIEF DESCRIPTION OF DRAWINGS

FIG. 2 is a schematic cross sectional view of a resolver in the first embodiment;

FIG. 3 is a diagram showing a rotor-side coil pattern of the resolver in the first embodiment;

FIG. 4 is a diagram showing a stator-side coil pattern in the first embodiment;

FIG. 6 is a block diagram showing position detecting control of the resolver in the first embodiment;

FIG. 7 is a cross sectional view of a resolver in a second embodiment;

FIG. 14 is a schematic cross sectional view of a resolver in a ninth embodiment;

FIG. 26 is a schematic cross sectional view of a resolver in a modified example of the first embodiment.

DESCRIPTION OF EMBODIMENTS

A detailed description of preferred embodiments of the present invention will now be given referring to the accompanying drawings.

First Embodiment

A first embodiment of the invention will be described below. The configuration in the first embodiment is first explained.

Figure 1:
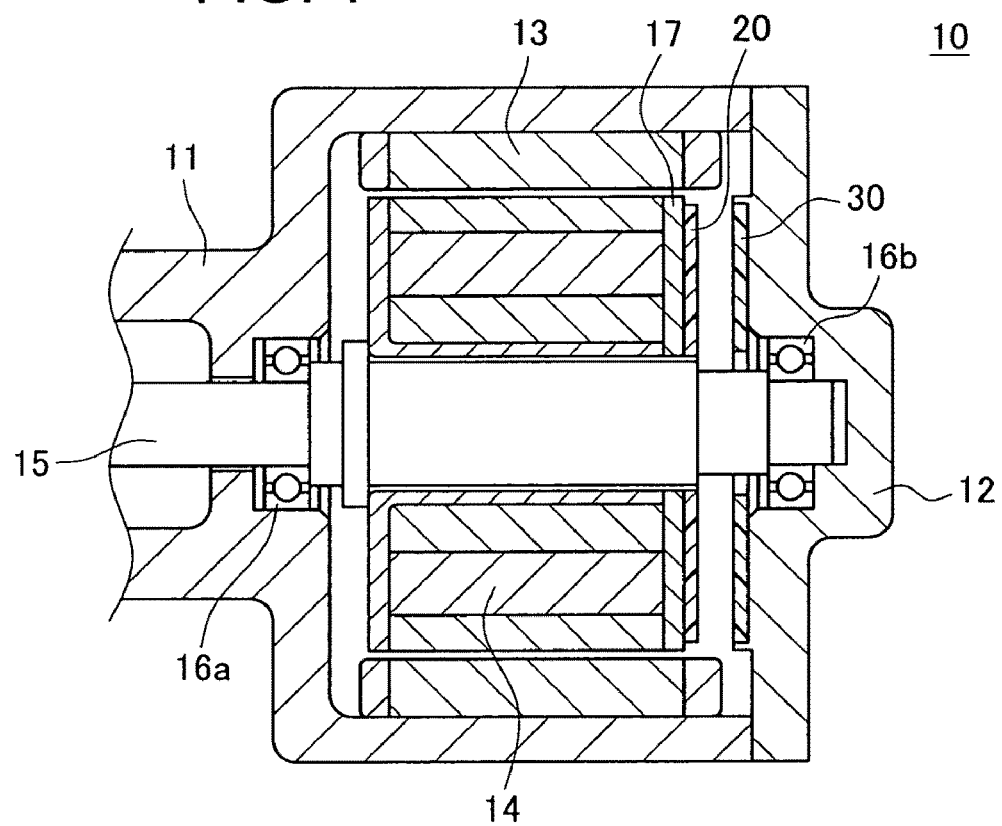
FIG. 1 is a cross sectional view simply showing a motor structure in a first embodiment.

FIG. 1 is a cross sectional view simply showing a motor structure in the first embodiment. A motor 10 is a brushless motor including a case body 11, a case cover 12, a motor stator 13, a motor rotor 14, a motor shaft 15, and motor bearings 16a and 16b.

The case body 11 and the case cover 12 are made of aluminum base alloy by casting. The motor bearing 16a is fitted in the case body 11 and the motor bearing 16b is fitted in the case cover 12 so that the motor shaft 15 is rotatably supported.

In the case body 11, the motor stator 13 is fixed on the inner wall. The motor stator 13 includes a coil that generates magnetic force when energized.

On the other hand, the motor rotor 14 provided with a permanent magnet is mounted on the motor shaft 15. The motor stator 13 and the motor rotor 14 are placed apart at a predetermined distance. When the stator 13 is energized, the rotor 14 is rotated, generating driving power, which is transmitted to the motor shaft 15.

A magnetic shield plate 17 is placed on an end face of the motor rotor 14. Specifically, one surface of the magnetic shield plate 17 is in contact with the rotor 14 and the other surface is in contact with a resolver rotor 20.

A resolver stator 30 is fixed to the case cover 12. When the case body 11 and the case cover 12 are assembled, the resolver rotor 20 and the resolver stator 30 are placed apart at a predetermined distance G. As this distance G is shorter, the detection accuracy of a resolver 100 is more improved. However, the distance G is determined in consideration of dimensional tolerance, dimensional changes resulting from temperature, and others.

Figure 5A:
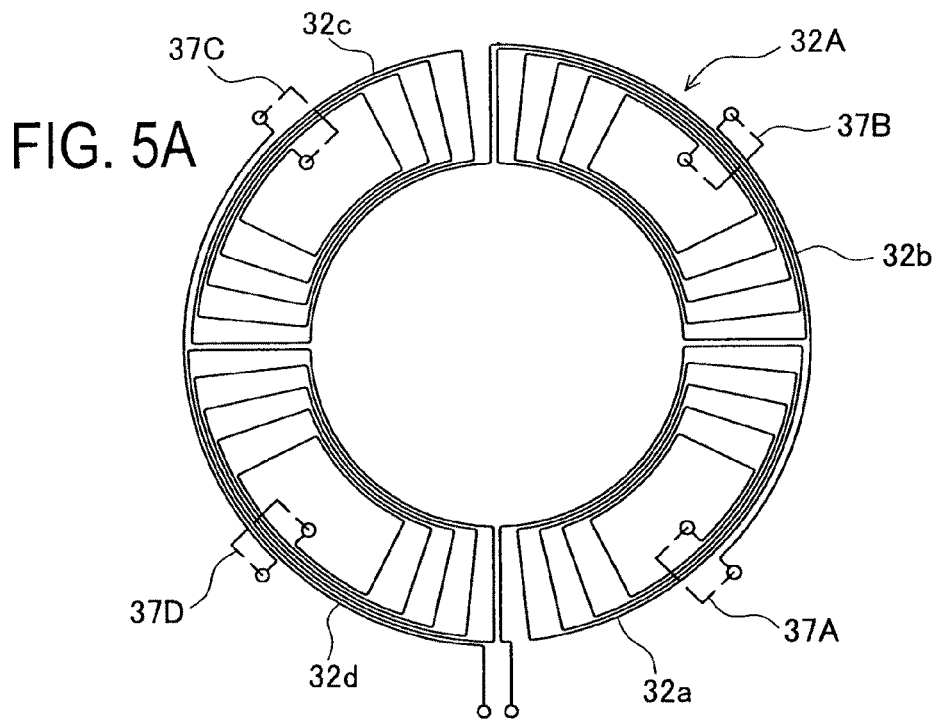
FIG. 5A is a diagram showing a coil pattern in a simplified form of a primary coil of an excitation coil in the first embodiment.
Figure 5B:
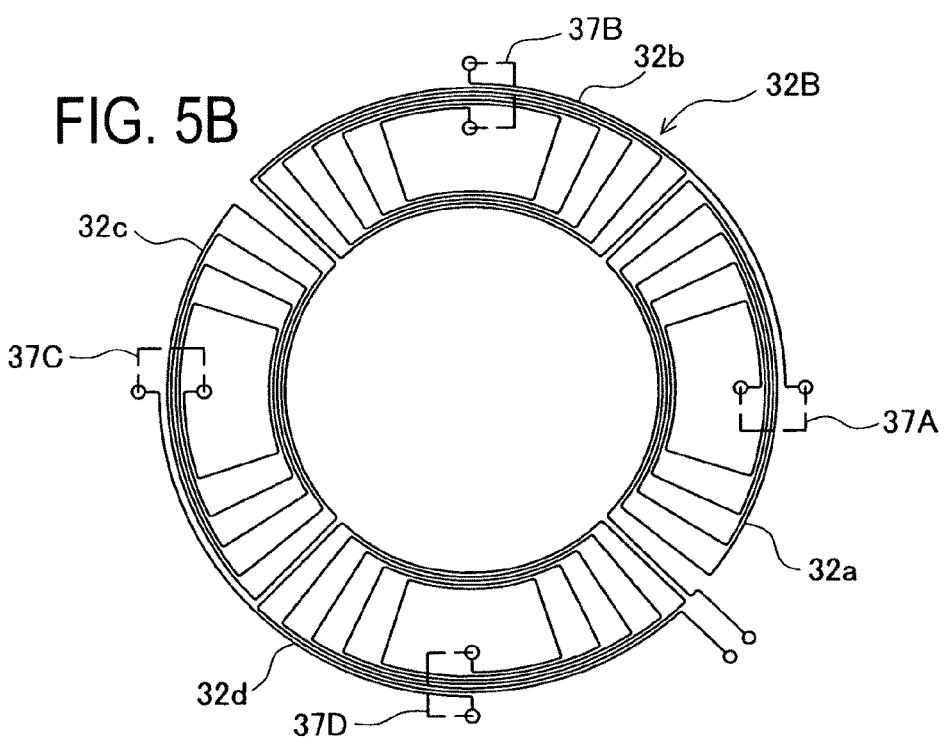
FIG. 5B is a diagram showing a coil pattern in a simplified form of a secondary coil of the excitation coil in the first embodiment.

FIG. 2 is a schematic cross sectional view of the resolver 100. FIG. 3 shows a rotor-side coil pattern in the resolver 100. FIG. 4 shows a stator-side coil pattern. FIG. 5A shows a coil pattern in a simplified form of a primary coil of an excitation coil. FIG. 5B shows a coil pattern in a simplified form of a secondary coil of the excitation coil.

The resolver 100 includes the resolver rotor 20 and the resolver stator 30. These rotor 20 and stator 30 are placed apart at the predetermined distance G.

The resolver rotor 20 includes a rotor body 21 made of liquid crystal polymer (LCP) or polyphenylene sulfide (PPS) and a detection coil 22 corresponding to a tertiary coil drawn on the surface of a rotor body 21 by ink jet.

The detection coil 22 includes a detection coil pattern 22A drawn with conductive ink made of silver paste prepared by mixing silver powder, dispersant, and others, and an electrically insulation layer (hereinafter, simply referred to as an insulation layer) 40 formed with insulating ink made of polyimide and others.

When the detection coil pattern 22A is to be formed on the surface of the rotor body 21 by use of the conductive ink, the conductive ink is applied in a thickness of about 10 to 20 μm to form the pattern 22A and then burned in a furnace. Burning causes the dispersant to evaporate, forming a silver thin film having a thickness of 2 to 5 μm on the surface of the rotor body 21. A wire or line width of the coil pattern is about 0.5 mm.

After the detection coil pattern 22A is formed, the insulation layer 40 is formed thereon by ink jet. The shape of the insulation layer 40 is not complicated and therefore may be formed by sticking a film, using screen printing, or other techniques.

The resolver rotor 20 includes a rotor-side rotary transformer 24. The rotary transformer 24 is configured such that a rotary transformer pattern 24A is formed with conductive ink and an insulation layer 40 is formed thereon. The rotary transformer pattern 24A is similarly formed by the technique to form the detection coil pattern 22A.

The resolver 100 is a 2× resolver. Accordingly, the detection coil pattern 22A is configured such that four coil elements, i.e., a first detection coil element 22a, a second detection coil element 22b, a third detection coil element 22c, and a fourth detection coil element 22d, are connected in series and further connected to the rotary transformer pattern 24A. Such connections are made by a first connecting wire 28A, a second connecting wire 28B, a third connecting wire 28C, and a fourth connecting wire 28D.

To be specific, the first detection coil element 22a connected to the rotary transformer pattern 24A by the first connecting wire 28A is wound from inside to outside and connected to the second detection coil element 22b. The second detection coil element 22b is wound from outside to inside and connected to the third detection coil element 22c by the second connecting wire 28B and the third connecting wire 28C. The third detection coil element 22c is wound from inside to outside and connected to the fourth detection coil element 22d. The fourth detection coil element 22d is wound from outside to inside and connected to the rotary transformer pattern 24A by the fourth connecting wire 28D.

The first to fourth connecting wires 28A to 28D are formed of conductive wires embedded in the resolver rotor 20.

Furthermore, the resolver rotor 20 includes a detection coil back core 25 and a rotary transformer back core 26 each being embedded in the rotor body 21 by insert molding.

The detection coil back core 25 is constituted of metal elements each having a slightly smaller width in a radial direction of the rotor 20 than the outside width between the outer circumference at the inside of the rotor 20 and the outer circumference at the outside of the rotor 20 of each coil element (22a to 22d) forming the detection coil pattern 22A shown in FIG. 3. The metal elements are arranged circularly in correspondence with the detection coil 22.

The rotary transformer back core 26 is formed of an annular metal element having a slightly larger width than the rotary transformer pattern 24A shown in FIG. 3 corresponding to the rotor-side rotary transformer 24. Each back core needs to be made of a magnetic material, preferably for example a ferromagnetic material such as iron, ferritic stainless steel, and resin containing iron powder.

The resolver rotor 20 is formed with a rotor positioning pin hole 27 engageable with a positioning pin provided in a part of the magnetic shield plate 17. The detection coil pattern 22A and the rotary transformer pattern 24A are drawn with reference to the pin hole 27.

The resolver stator 30 includes a stator body 31 made of LCP resin or PPS resin and an excitation coil 32 drawn on the surface of the body 31 by ink jet.

The excitation coil 32 includes a first excitation coil pattern 32A corresponding to a primary coil and a second excitation coil pattern 32B corresponding to a secondary coil drawn with conductive ink, and insulation layers 40 drawn with insulating ink.

Furthermore, the resolver stator 30 also includes a stator-side rotary transformer 34. This rotary transformer 34 is formed by drawing a rotary transformer pattern 34A with conductive ink and forming an insulation layer 40 thereon.

The method of drawing the conductive ink and the insulation layer 40 are the same as those for the resolver rotor 20 and the explanation thereof is not repeated herein.

The excitation coil 32 includes the first excitation coil pattern 32A to which a cosine wave is supplied and the second excitation coil pattern 32B to which a sine wave is supplied. The first excitation coil pattern 32A of the primary coil and the second excitation coil pattern 32B of the secondary coil are the same patterns but placed at positions shifted or displaced from each other by 90° in electrical angle. An insulation layer 40 is provided between those patterns 32A and 32B. The first excitation coil pattern 32A, the second excitation coil pattern 32B, and the rotary transformer pattern 34A are connected to a circuit 38.

The resolver stator 30 is provided with an excitation coil back core 35 embedded in the stator body 31 by insert molding.

As FIGS. 5A and 5B respectively show the first excitation coil pattern 32A and the second excitation coil pattern 32B in simplified forms, the resolver 100 is a 2× resolver and hence each excitation coil has two N poles and two S poles alternately arranged. The first excitation coil element 32a connected to the circuit 38 is wound from outside to inside and connected to the second excitation coil element 32b by a second connecting wire 37B connected to a first connecting wire 37A. The second excitation coil element 32b is wound from inside to outside and connected to the third excitation coil element 32c. The third excitation coil element 32c is wound from outside to inside and connected to a fourth excitation coil element 32d by a fourth connecting wire 37D connected to a third connecting wire 37C. The fourth excitation coil element 32d is wound from inside to outside and connected to the circuit 38. The first to fourth connecting wires 37A to 37D are formed of conductive wires embedded in the resolver stator 30.

The second excitation coil pattern 32B has the same connecting configuration as above and hence its explanation is not repeated herein.

The resolver stator 30 is provided with a stator positioning pin hole 39. This pin hole 39 is a hole in which a positioning pin provided in the case cover 12 is engageable. The first excitation coil pattern 32A, the second excitation coil pattern 32B, and the rotary transformer pattern 34A are drawn with reference to the pin hole 39.

FIG. 6 is a block diagram showing position detecting control of the resolver. The motor 10 includes the circuit 38 and a sensor section 50. The circuit 38 includes a sine wave generator 381, a high frequency generator 382, a cosine wave generator 383, a first modulator 384, a second modulator 385, a wave detector 386, and a phase difference detector 387. The sensor section 50 includes the excitation coil 32, the detection coil 22, a rotor-side rotary transformer 24, and a stator-side rotary transformer 34.

The sine wave generator 381 for generating a sine wave of 7.2 kHz is connected to the first modulator 384 as shown in FIG. 6. The cosine wave generator 383 for generating a cosine wave of 7.2 kHz is connected to the second modulator 385.

The high frequency generator 382 for generating a sine wave of 360 kHz is connected to the first modulator 384 and the second modulator 385 respectively. The sine wave generator 381 is connected to the phase difference detector 387. The wave detector 386 is connected to the phase difference detector 387.

The first modulator 384 is connected to the second excitation coil pattern 32B. The second modulator 385 is connected to the first excitation coil pattern 32A. The detection coil 22 is connected to the rotor-side rotary transformer 24. The stator-side rotary transformer 34 is connected to the wave detector 386.

The first embodiment has the above configuration and thus provides the following operations and advantages.

A first advantage is to provide the thin-shaped and low-cost resolver 100. The resolver 100 in the first embodiment comprises the disc-shaped resolver rotor 20 provided with the detection coil pattern 22A formed in flat shape, the planar resolver stator 30 placed to concentrically face the resolver rotor 20 in the axial direction, the stator 30 including the planar first excitation coil pattern 32A to which a cosine wave is supplied and the planar second excitation coil pattern 32B to which a sine wave is supplied, the patterns 32A and 32B being laminated. In such resolver 100, the first and second excitation coil patterns 32A and 32B are placed to face the detection coil pattern 22A. The insulation layer 40 made of the insulating coating material is provided between the first and second excitation coil patterns 32A and 32B.

Specifically, the insulation layer 40 is formed by use of the insulating ink different from a conventional method. In the conventional method, a printed substrate or a sheet-shaped printed substrate is used, needing a certain degree of thickness. For example, the sheet-shaped printed substrate has a thickness of about 0.1 to 1.6 mm. On the other hand, the insulation layer 40 formed of the insulating ink has a thickness of about 2 to 10 μm. Thus, the insulation layer 40 can be formed thinner than the conventional one. This thickness provides sufficient insulating performance and hence the insulation layer 40 can have a reduced thickness.

Consequently, the distance difference (e.g. about 0.3 to 1 mm) between the detection coil pattern 22A and the first and second excitation coil patterns 32A and 32B facing the pattern 22A is decreased, thereby contributing to detection of a correct angle.

The insulation layer 40 can be formed with the insulating ink in shorter time than in a method needing several etching processes such as a printed substrate. Accordingly, the material cost can be made low, achieving cost reduction.

Another advantage is to enhance the magnetic flux of the detection coil 22 by the detection coil back core 25.

Specifically, in the resolver 100 in the first embodiment, the resolver rotor 20 includes the detection coil back core 25 made of a magnetic material and placed in correspondence with the detection coil pattern 22A and the resolver stator 30 includes the excitation coil back core 35 made of a magnetic material and placed in correspondence with the first and second excitation coil patterns 32A and 32B.

Since the resolver rotor 20 includes the detection coil back core 25 and the resolver stator 30 includes the excitation coil back core 35, the magnetic flux of a magnetic circuit is enhanced.

Many of sheet-shaped resolvers only allow a small amount of current to flow and therefore have a problem with accuracy. In particular, when the detection coil 22, the excitation coil 32, the rotor-side rotary transformer 24, and the stator-side rotary transformer 34 are drawn by ink jet, each circuit only has a small cross sectional area.

Accordingly, the amount of current allowed to flow in each circuit lowers, decreasing the strength or intensity of the magnetic flux, thus leading to deteriorated accuracy of the resolver 100. However, the detection coil back core 25, the excitation coil back core 35, and the rotary transformer back core 26 are provided in the first embodiment, so that the magnetic flux generated by each circuit can be enhanced. Thus, a magnetic circuit with high efficiency can be formed.

Then enhanced magnetic flux can improve the detection accuracy of the resolver 100. This is advantageous in present circumstances demanding thickness reduction and size reduction of the resolver 100.

Another advantage is the cost reduction of the resolver 100 achieved by insert-molding the detection coil back core 25 and the excitation coil back core 35 in either or both of the rotor body 21 and the stator body 31.

In the resolver 100 in the first embodiment, the detection coil back core 25 is insert-molded in the rotor body 21 of the resolver rotor 20 or the excitation coil back core 35 is insert-molded in the stator body 31 of the resolver stator 30. Adopting the insert molding can easily hold the detection coil back core 25 and the excitation coil back core 35 in the rotor body 21 or the stator body 31. This can contribute cost reduction. As alternatives, the resolver 100 may be configured not to include the excitation coil back core 35 as shown in FIG. 26 or not to include the detection coil back core 25 and the rotary transformer back core 26 even though it is not illustrated. This configuration is lower in detection accuracy than the configuration including all the back cores 25, 26, and 35 but is expected to provide more improved detection accuracy than a configuration that does not include all the back cores 25, 26, and 35.

Another advantage is to provide the low-cost resolver 100 by drawing the detection coil pattern 22A or the first and second excitation coil patterns 32A and 32B with conductive ink.

In the resolver 100 in the first embodiment, the rotor positioning pin hole 27 is formed in the rotor body 21 to fix the resolver rotor 20 and the detection coil pattern 22A is formed with conductive coating material with reference to the pin hole 27. The stator positioning pin hole 39 is formed in the stator body 31 to fix the resolver stator 30. The first excitation coil pattern 32A or the second excitation coil pattern 32B is formed with conductive coating material with reference to the pin hole 39.

Since the coil patterns of the resolver rotor 20 and the resolver stator 30 are formed with conductive ink and insulating ink, thickness reduction can be achieved and the number of processes can be reduced because etching is not required as for printed coils.

The detection coil pattern 22A and the first and second excitation coil patterns 32A and 32B are each formed with reference to a portion serving as a mounting reference such as the rotor positioning pin hole 27 and the stator positioning pin hole 39. Accordingly, it is unlikely to cause mounting angle errors when the resolver 100 is mounted in the motor 10. Thus, the resolver 100 can provide improved detection accuracy.

Furthermore, another advantage is to achieve cost reduction of the resolver 100 by including the rotor body 21 and the stator body 31 each made of resin.

At least one of the rotor body 21 of the resolver rotor 20 and the stator body 31 of the resolver stator 30 is made of insulating resin. Accordingly, insert molding of the back core(s) can be facilitated and also the improvement of water resistance and oil resistance can be expected. In many cases, the motor 10 and the resolver 100 use oil for cooling when the motor 10 is used as a power source of a vehicle. Therefore, the resolver 100 may be subjected to oil and therefore needs oil resistance.

Second Embodiment

A second embodiment of the invention will be described below. The basic configuration thereof is almost identical to the resolver 100 in the first embodiment excepting a manner of forming the first to fourth connecting wires 28A to 28D and the first to fourth connecting wires 37A to 37D. The following explanation is therefore focused on the differences.

FIG. 7 is a cross sectional view of a resolver in the second embodiment. A resolver rotor 20 includes a detection coil 22 and a rotor-side rotary transformer 24. The first to fourth connecting wires 28A to 28D are drawn and then an insulation layer 40 is formed thereon. Furthermore, a detection coil pattern 22A and a rotary transformer pattern 24A are drawn on the insulation layer 40, and another insulation layer 40 is further formed on the patterns 22A and 24A.

The resolver stator 30 includes an excitation coil 32 and a stator-side rotary transformer 34. The first to fourth connecting wires 37A to 37D are drawn and then an insulation layer 40 is formed thereon. Furthermore, a first excitation coil pattern 32A and a rotary transformer pattern 34A are drawn on the insulation layer 40 and then another insulation layer 40 is formed thereon. On this insulation layer 40, the first to fourth connecting wires 37A to 37D are drawn. Another insulation layer 40 is further formed on the lines 37A to 37D, the second excitation coil pattern 32B is drawn thereon, and another insulation layer 40 is formed.

The second embodiment having the above configuration can provide the following operations and advantages.

The detection coil pattern 22A, the rotary transformer pattern 24A, the first and second excitation coil patterns 32A and 32B, the stator-side rotary transformer 34, the first to fourth connecting wires 28A to 28D, and the first to fourth connecting wires 37A to 37D are each drawn with conductive ink by ink jet. Each insulation layer 40 is drawn with insulating ink by ink jet. Consequently, the resolver 100 can be easily configured in a multilayer configuration, achieving more cost reduction than a printed substrate.

Third Embodiment

A third embodiment of the invention will be described below. The basic configuration is almost identical to the resolver 100 in the first embodiment excepting a method of fixing the resolver rotor 20.

Figure 8:
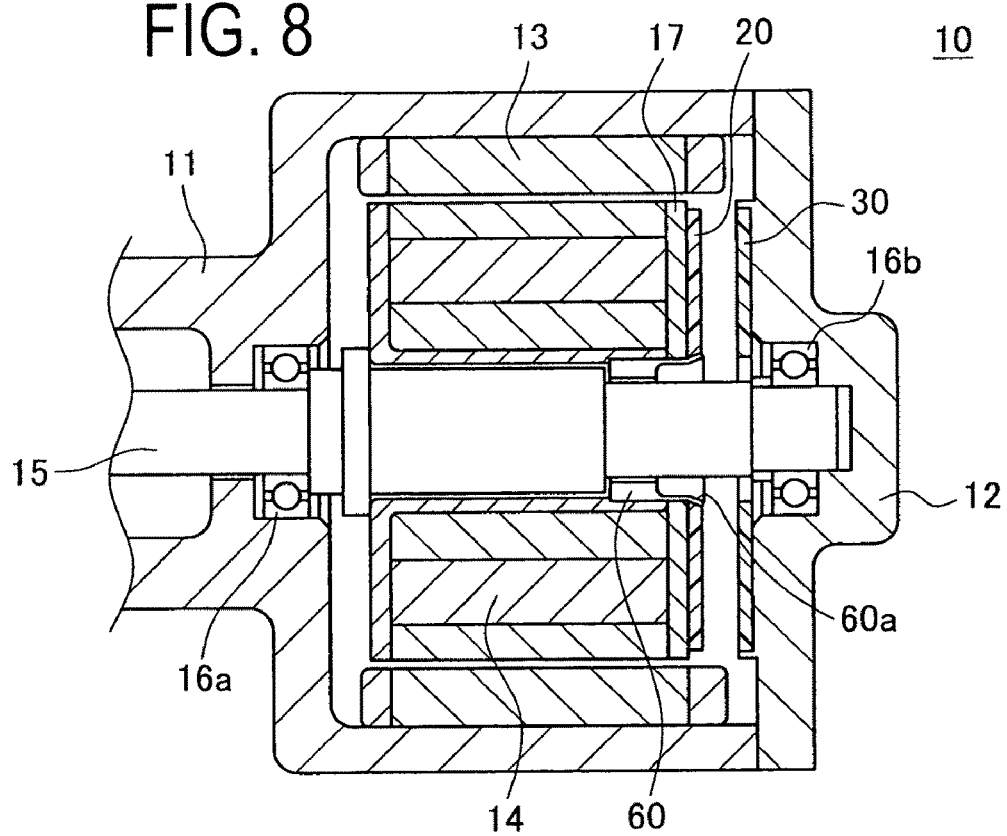
FIG. 8 is a cross sectional view of a motor in a third embodiment.

FIG. 8 is a cross sectional view of a motor in the third embodiment. A resolver 100 in the third embodiment employs a stopper 60 as the method of fixing the resolver rotor 20.

The stopper 60 includes a caulking portion 60a opposite a contact portion of the stopper 60 with a stepped portion of a motor shaft 15. A magnetic shield plate 17 is fixed to the end face of a motor rotor 14, the resolver rotor 20 is mounted on the shield plate 17, and the stopper 60 is fitted on the shaft 15 and the caulking portion 60a is expanded for caulking. The stopper 60 is press-fitted with respect to the shield plate 17, thereby fixing the resolver rotor 20 to the shield plate 17.

Fourth Embodiment

A fourth embodiment of the invention will be described below. The basic configuration is almost identical to the resolver 100 in the first embodiment excepting a method of fixing the resolver rotor 20.

Figure 9:
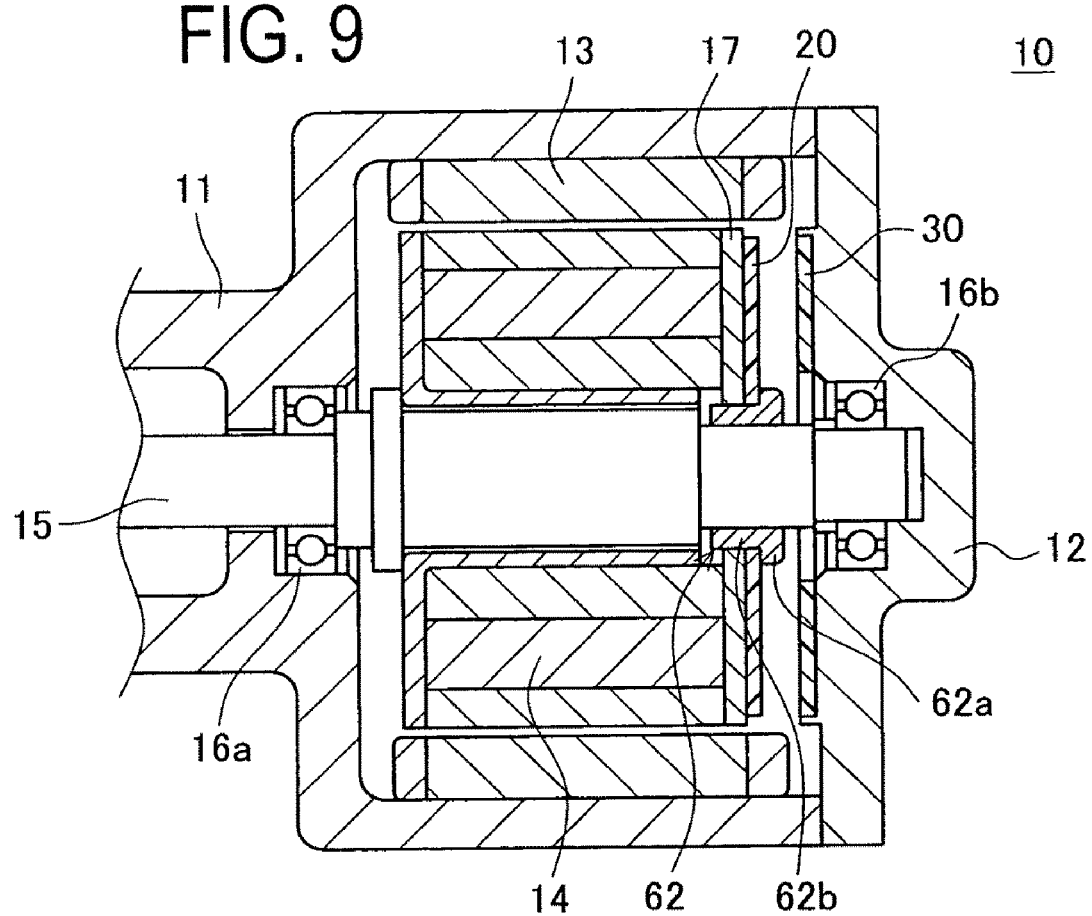
FIG. 9 is a cross sectional view of a motor in a fourth embodiment.

FIG. 9 is a cross sectional view of a motor in the fourth embodiment. A resolver 100 in the fourth embodiment employs a press-fit member 62 as the method of fixing the resolver rotor 20. The press-fit member 62 includes a flange 62a and a cylindrical shaft 62b so that the shaft 62b is press-fitted in a magnetic shield plate 17 to hold the resolver rotor 20 by the flange 62a.

Fifth Embodiment

A fifth embodiment of the invention will be described below. The basic configuration is almost identical to the resolver 100 in the first embodiment excepting a method of fixing the resolver rotor 20.

Figure 10:
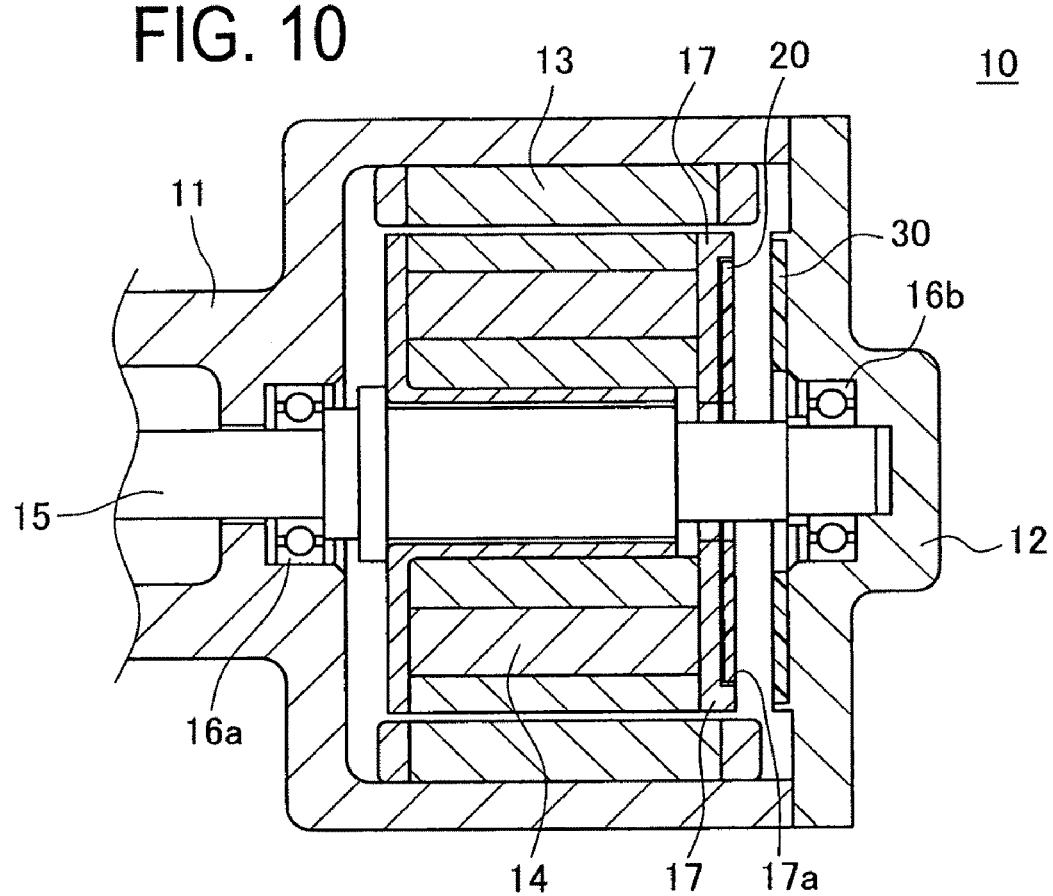
FIG. 10 is a cross sectional view of a motor in a fifth embodiment.

FIG. 10 is a cross sectional view of a motor in the fifth embodiment. A resolver 100 in the fifth embodiment is provided with a recess 17a in a magnetic shield plate 17 as the method of fixing the resolver rotor 20. Thereby the resolver rotor 20 is held in the inner periphery of the recess 17a and fixed to the shield plate 17 with adhesive. This adhesive should be a material resistant to temperature rise of the motor 10 and resistant to oil or the like used in the motor 10.

By using the stopper 60 as in the third embodiment, the press-fit member 62 as in the fourth embodiment, or the recess 17a in the magnetic shield plate 17 as in the fifth embodiment, it is possible to easily and inexpensively position and hold the resolver rotor 20 with respect to the magnetic shield plate 17.

Sixth Embodiment

Figure 11A:
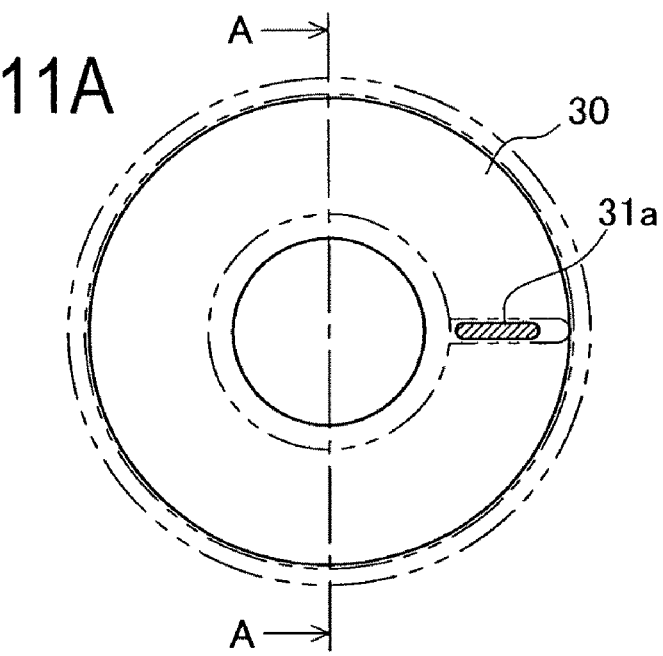
FIG. 11A is a front view of a resolver stator in a sixth embodiment.
Figure 11B:
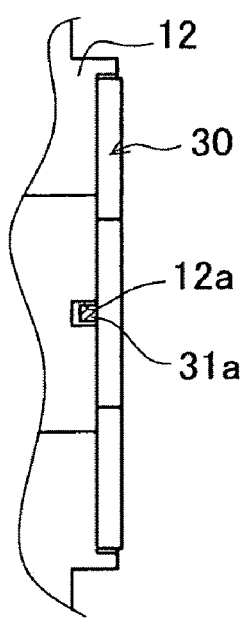
FIG. 11B is a cross sectional view of a case cover taken along a line A-A in FIG. 11A in the sixth embodiment.

A sixth embodiment of the invention will be described below. The basic configuration is almost identical to the resolver 100 in the first embodiment excepting a configuration of a mounting part of the resolver stator 30. FIG. 11A is a front view of a resolver stator in the sixth embodiment. FIG. 11B is a cross sectional view of a case cover taken along a line A-A in FIG. 11A.

The resolver stator 30 in the sixth embodiment is provided with a positioning stopper 31a in a stator body 31. This stopper 31a is a protrusion formed in an elliptic shape as shown in FIG. 11A. When the resolver stator 30 is mounted in the case cover 12, the stopper 31a is inserted in a recess 12a formed in the case cover 12.

Since the stator body 31 is provided with the positioning stopper 31a and the case cover 12 is formed with the recess 12a, the resolver stator 30 is positioned with respect to the case cover 12.

Drawing of a first excitation coil pattern 32A, a second excitation coil pattern 32B, and others on the resolver stator 30 is performed relative to the stopper 31a. Accordingly, a variation of a coil mounting angle between the resolver rotor 20 and the resolver stator 30 decreases, thereby enabling detection of a correct angle.

Seventh Embodiment

Figure 12A:
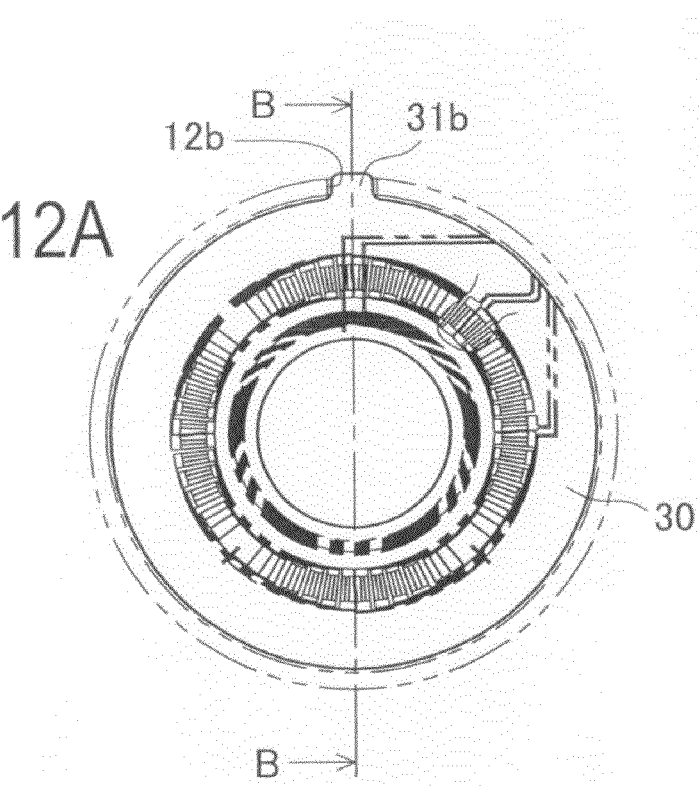
FIG. 12A is a front view of a resolver stator in a seventh embodiment.
Figure 12B:
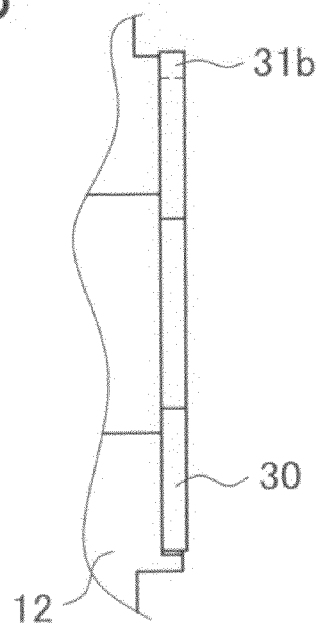
FIG. 12B is a cross sectional view of a case cover taken along a line B-B in FIG. 12A in the seventh embodiment.

A seventh embodiment of the invention will be described below. The basic configuration is almost identical to the resolver 100 in the first embodiment excepting a configuration of a mounting part of a resolver stator 30. FIG. 12A is a front view of a resolver stator in the seventh embodiment. FIG. 12B is a cross sectional view of a case cover taken along a line B-B in FIG. 12A. The resolver stator 30 in the seventh embodiment is provided with a positioning protrusion 31b and a case cover 12 is provided with a positioning recess 12b.

When the resolver stator 30 is mounted in the case cover 12, the protrusion 31b of the resolver stator 30 is inserted in the recess 12b of the case cover 12. Since the stator body 31 is provided with the protrusion 31b and the case cover 12 is provided with the recess 12b, the resolver stator 30 is positioned with respect to the case cover 12.

Furthermore, drawing of first and second excitation coil patterns 32A and 32B and others on the resolver stator 30 is performed relative to the positioning protrusion 31b. Accordingly, a variation of a coil mounting angle between the resolver rotor 20 and the resolver stator 30 decreases, thereby enabling detection of a correct angle.

Eighth Embodiment

Figure 13A:
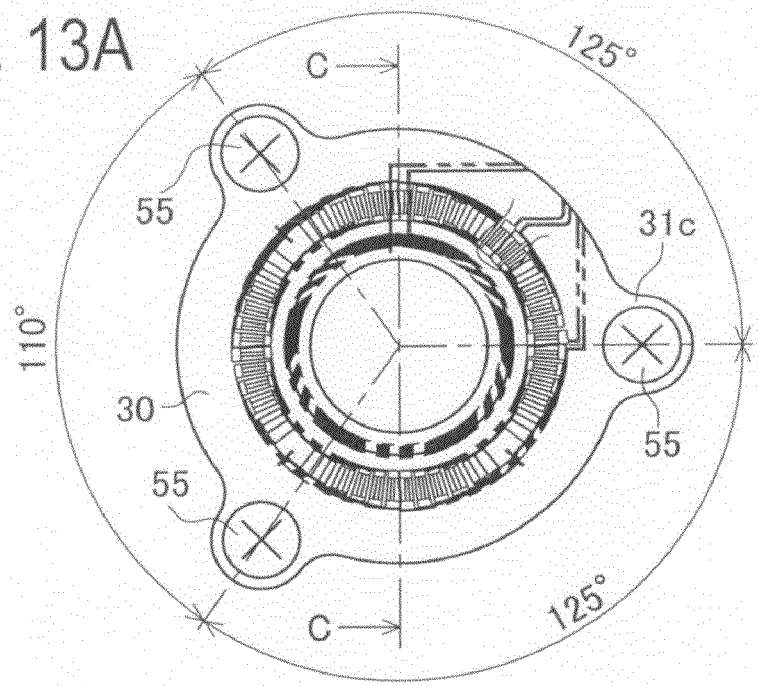
FIG. 13A is a front view of a resolver stator in an eighth embodiment.
Figure 13B:
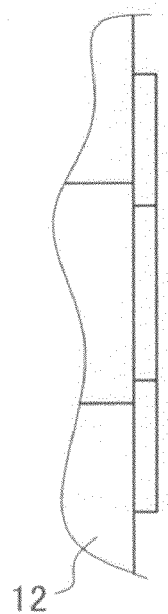
FIG. 13B is a cross sectional view of a case cover taken along a line C-C in FIG. 13A in the eighth embodiment.

An eighth embodiment of the invention will be described below. The basic configuration is almost identical to the resolver 100 in the first embodiment excepting a configuration of a mounting part of the resolver stator 30. FIG. 13A is a front view of a resolver stator in the eighth embodiment. FIG. 13B is a cross sectional view of a case cover taken along a line C-C in FIG. 13A.

A resolver stator 30 in the eighth embodiment is provided with screw stoppers 31c at three places so that the centers of mounting screws 55 are located at circumferentially intervals of 125°, 125°, and 110°.

A stator body 31 is provided with the screw stoppers 31c and the case cover 12 is provided with bolt holes not shown in which the screws 55 are individually engaged. The resolver stator 30 is secured to the case cover 12 with the screws 55. In this way, the position of the resolver stator 30 is fixed with respect to the case cover 12. Since the stator body 31 is formed with the stoppers 31c arranged at unequal angular places, the mounting posture of the resolver stator 30 is fixedly determined. Thus, the stoppers 31c can serve as a positioning means.

Furthermore, first and second excitation coil patterns 32A and 32B are drawn on the resolver stator 30 with reference to any of the screw stoppers 31c. Therefore, a variation of a coil mounting angle between the resolver rotor 20 and the resolver stator 30 decreases, thereby enabling detection of a correct angle.

Ninth Embodiment

A ninth embodiment of the invention will be described below. The configuration in the ninth embodiment is first explained. The basic configuration is almost identical to the resolver 100 in the first embodiment excepting a configuration of first to fourth connecting wires 28A to 28D and first to sixth connecting wires 37A to 37F.

Figure 15A:
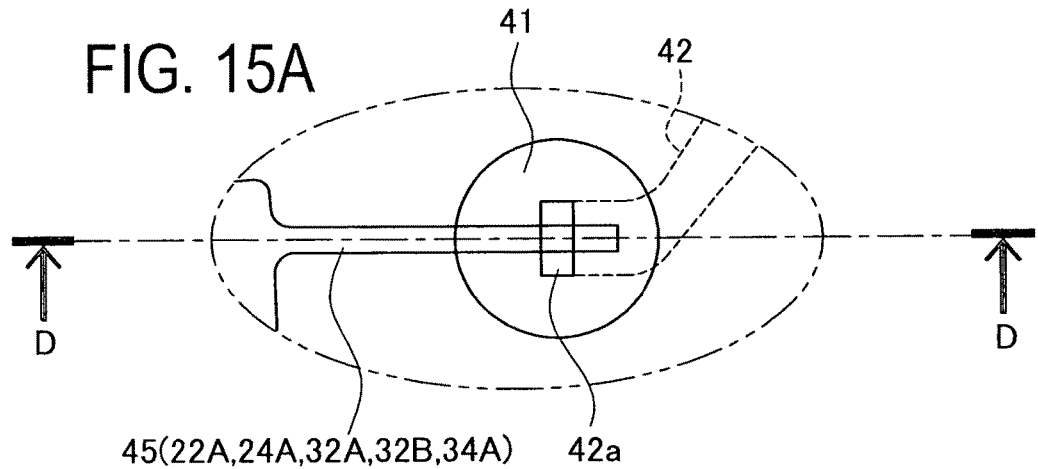
FIG. 15A is a top view of an end portion of a connecting wire in the ninth embodiment.
Figure 15B:
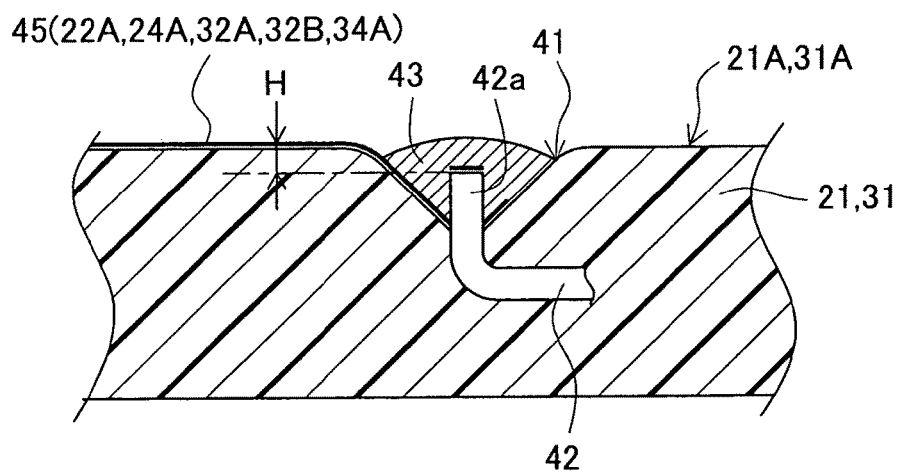
FIG. 15B is a cross sectional view of the end portion taken along a line D-D in FIG. 15A in the ninth embodiment.

FIG. 14 is a schematic cross sectional view of a resolver in the ninth embodiment. FIG. 15A is a top view of an end portion of one connecting wire. FIG. 15B is a cross sectional view of the end portion taken along a line D-D in FIG. 15A.

The first to fourth connecting wires 28A to 28D are insert-molded in the rotor body 21 and the first to sixth connecting wires 37F are insert-molded in the stator body 31, respectively. For convenience of explanation, those connecting wires are also referred to as a connecting wire 42. Hereinafter, the connecting wire 42 represents all or any one of the first to fourth connecting wires 28A to 28D and the first to sixth connecting wires 37A to 37F. An end portion of the connecting wire 42 is referred to as a connecting wire end portion 42a.

The connecting wire end portion 42a is formed to protrude into a recess 41 formed on each of a rotor body end face 21A and a stator body end face 31A. Specifically, a leading end of the connecting wire end portion 42a is located at a position lower by a distance H from the rotor body end face 21A or the stator body end face 31A as shown in FIG. 15B.

The recess 41 has a diameter about four times larger than the width of the connecting wire end portion 42a. The recess 41 is formed in a cone shape around the connecting wire end portion 42a in the rotor body 21 or the stator body 31 so that the connecting wire 42 passes through the apex of the cone-shaped recess 41. In this embodiment, the connecting wire end portion 42a is a copper wire having a width of about 1.5 mm and hence the recess 41 has a diameter of about 6 mm.

Each conductive wire (line) 45 forming a detection coil pattern 22A, a rotary transformer pattern 24A, first and second excitation coil patterns 32A and 32B, and a rotary transformer pattern 34A is drawn to overlap an end surface of the connecting wire end portion 42a. Then, silver paste 43 is applied on the recess 41. As an alternative, the conductive wires 45 may be formed without overlapping the connecting wire end portion 42a. Then, the above components are burned in a furnace to ensure electrical connection between the conductive wire 45 and the connecting wire end portion 42a.

The ninth embodiment having the above configuration can provide the following operations and advantages.

A first advantage is to reliably provide electrical connection between the conductive wire 45 and the connecting wire end portion 42a forming a coil.

According to the ninth embodiment, the resolver 100 includes: the resolver rotor 20 including the rotor body 21 having the end face 21A formed with the detection coil pattern 22A and the rotary transformer 24A as planar coils; the resolver stator 30 including the stator body 31 having the end face 31A formed with the first and second excitation coil patterns 32A and 32B and the rotary transformer pattern 34A as planar coils; and the connecting wires 42 provided in the rotor body 21 and the stator body 31 and connected to the planar coils. In the resolver 100, the end portion 42a of the connecting wire 42 is provided to protrude from the rotor body 21 or the stator body 31, and the recess 41 is formed around the end portion 42a on the rotor body end face 21A of the rotor body 21 formed with the detection coil pattern 22A or the rotary transformer pattern 24A or on the stator body end face 31A of the stator body 31 formed with the first excitation coil pattern 32A, the second excitation coil pattern 32B, or the rotary transformer pattern 34A.

Since the connecting wire end portion 42a is placed protruding from the rotor body end face 21A or the stator body end face 31A and the recess 41 is formed around the connecting wire end portion 42a, it is possible to prevent leakage of the silver paste 43 to other portions, thereby avoiding short circuit or the like.

The conductive wire (line) 45 such as the detection coil pattern 22A could not be drawn to be thick with conductive coating material. This is because even when the wire 45 is drawn with a thickness of about 10 to 20 μm by ink jet, the thickness of the wire 45 decreases to about 2 to 5 μm when burned. Although the wire may be formed by multiple coating, the number of processes is increased and further displacement of patterns has to be taken into account. The multiple coating is therefore undesirable for the resolver 100 first needing cost reduction.

In the above case where the thin conductive wire 45 is electrically connected to the connecting wire end portion 42a of the connecting wire 42, a conductive wire having a certain thickness is more effective. In the ninth embodiment, accordingly, the silver paste 43 is used.

In the case of adopting the silver paste 43, it can be burned together with the conductive wire 45. It is therefore advantageous to avoid an increase in the number of processes. In addition, the silver paste 43 covers over the connecting wire end portion 42a and the conductive wire 45, thereby reliably providing electrical connection between them. At this time, the silver paste 43 may leak to the adjacent conductive wire 45 side, resulting in short circuit. However, the recess 41 can prevent such defect. Consequently, improvement in yield can be achieved.

In the resolver 100, the detection coil pattern 22A and others are formed with conductive ink which is a conductive coating material to form the wire 45 to extend to the vicinity of the connecting wire end portion 42a in the recess 41. Thus, the conductive wire 45 and the connecting wire 42 can be reliably connected by the connecting wire end portion 42a.

In the resolver 100, furthermore, the height of each connecting wire end portion 42a protruding from the rotor body 21 or the stator body 31 is lower than the rotor body end face 21A and the stator body end face 31A. Each connecting wire end portion 42a is covered by the silver paste 42.

The rotor body 21 and the stator body 31 used in the resolver 100 are mounted apart at a predetermined distance G in the motor 10. This distance G is determined by assuming the positions at which the resolver rotor 20 and the resolver stator 30 do not interfere with each other in order to ensure the detection accuracy of the resolver 100. In case each connecting wire end portion 42a protrudes from the rotor body end face 21A and the stator body end face 31A, the resolver rotor 20 and the resolver stator 30 are likely to interfere with each other.

In this embodiment, however, each connecting wire end portion 42a protrudes within the recess 41 so as to be lower by the distance H than the rotor body end face 21A and the stator body end face 31A, the distance G does not have to be longer than necessary. This contributes to improvement of detection accuracy of the resolver 100.

In the resolver 100, the rotor body 21 and the stator body 31 are made of resin and each connecting wire 42 is insert-molded therein. This can prevent an increase in the number of processes and contribute to cost reduction.

Each connecting wire 42 is made of high conductive metal such as copper and aluminum. Each connecting wire 42 is insert-molded in place in the rotor body 21 and the stator body 31, and thereby the cost for embedding the connecting wire or the like is saved.

Tenth Embodiment

A tenth embodiment will be explained below. The configuration in the tenth embodiment is first explained. The tenth embodiment is almost identical in configuration to the ninth embodiment excepting the shape of the recess provided around the connecting wire end portion 42a and the explanation thereof is not repeated herein.

Figure 16A:
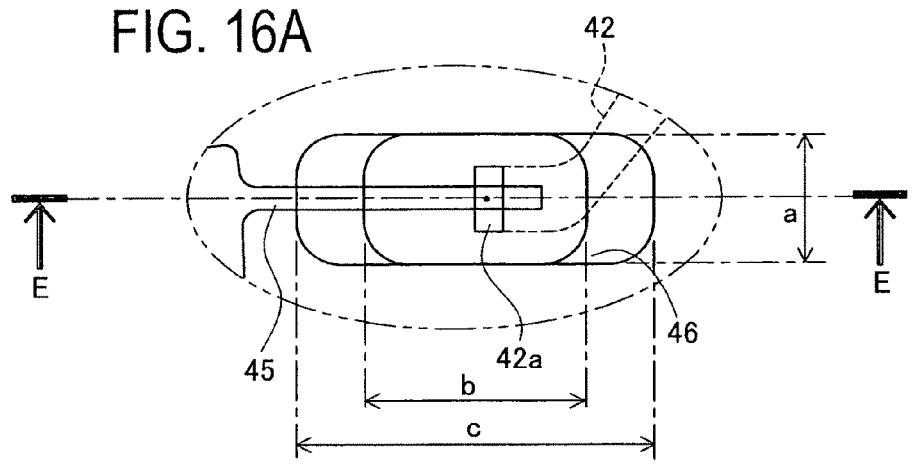
FIG. 16A is a top view of an end portion of a connecting wire in a tenth embodiment.
Figure 16B:
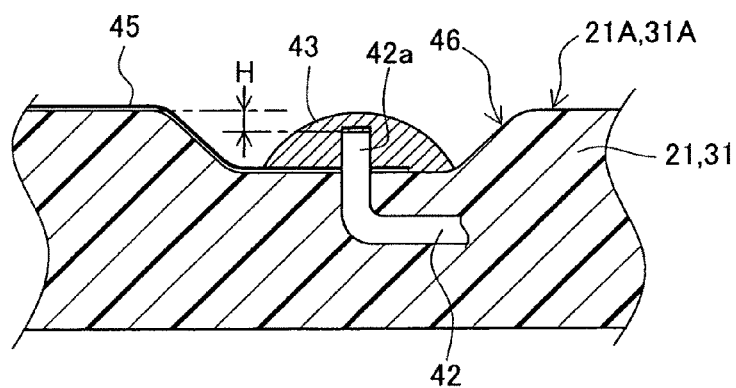
FIG. 16B is a cross sectional view of the end portion taken along a line E-E in FIG. 16A in the tenth embodiment.

FIG. 16A is a top view of a connecting wire end portion in the tenth embodiment. FIG. 16B is a cross sectional view of the connecting wire end portion taken along a line E-E in FIG. 16A. An oval recess 46 is provided around each connecting wire end portion 42a. This oval recess 46 has a size "a" three times larger than the width of the end portion 42a, a size "b" five times larger than the width of the end portion 42a, and a size "c" eight times larger than the width of the end portion 42a.

The tenth embodiment having the above configuration can provide the following operations and advantages.

The oval recess 46 is formed in a rotor body 21 or a stator body 31, so that silver paste 43 does not leak when applied to each connecting wire end portion 42a, thereby preventing short circuit with another circuit. The oval recess 46 is recessed with a larger volume than the recess 41 in the ninth embodiment and with a length longer in the lengthwise direction of the conductive wire 45. Accordingly, the silver paste 43 allows the conductive wire 45 to extend longer than in the ninth embodiment, thereby enhancing reliability of electrical connection.

Eleventh Embodiment

An eleventh embodiment will be described below. The configuration in the eleventh embodiment is first explained. The eleventh embodiment is almost identical in configuration to the ninth embodiment excepting a method of fixing the connecting wire 42. The following explanation is therefore given to the differences.

Figure 17:
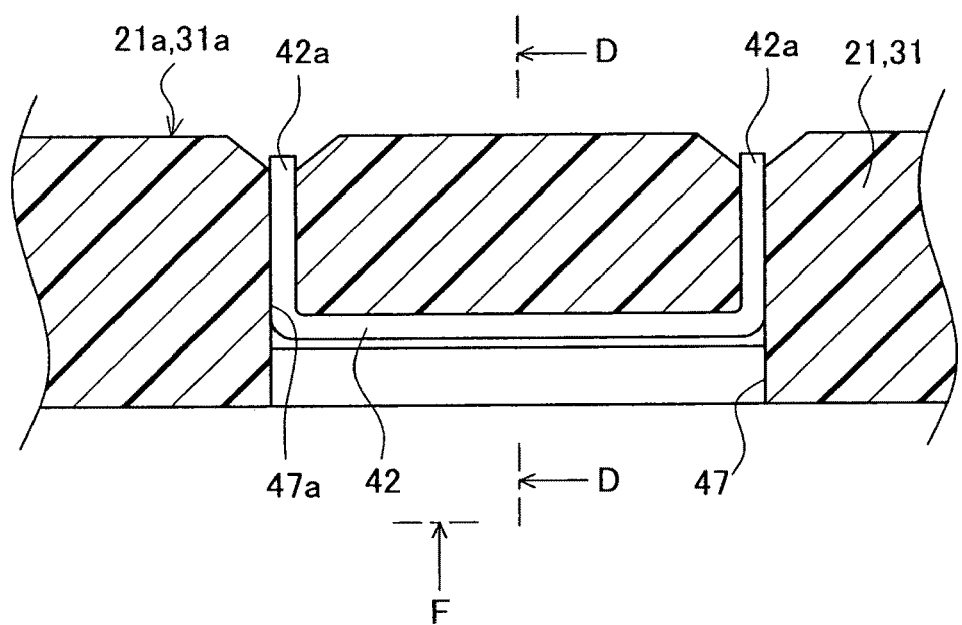
FIG. 17 is a cross sectional view of a body including a connecting wire and its surroundings in an eleventh embodiment.

FIG. 17 is a cross sectional view of a body including a connecting wire and its surrounding in the eleventh embodiment. A back-side opening 47 is formed on each of an end face of a rotor body 21 and a stator body 31 opposite from a rotor body end face 21A and a stator body end face 31A respectively. The opening 47 is formed with a groove 47a in which the connecting wire 42 is inserted. Specifically, the connecting wire 42 is inserted in the groove 47a from a back side of each of the rotor body 21 and the stator body 31. The connecting wire 42 is a conductive wire bent in U form and provided with connecting wire end portions 42a at both ends.

Figure 18:
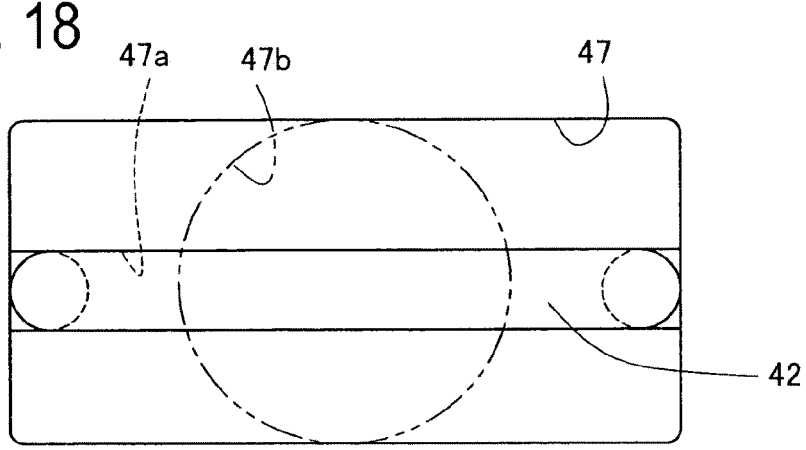
FIG. 18 is a view showing a state where the connecting wire is mounted in a body in the eleventh embodiment, taken in a direction of an arrow F.
Figure 19:
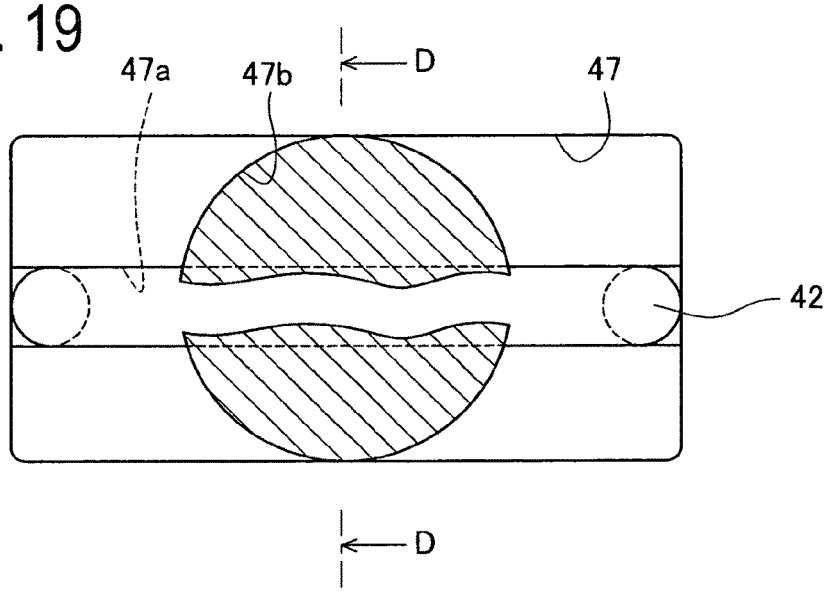
FIG. 19 is a view showing a state where the connecting wire mounted in the body is heat-welded in the eleventh embodiment.
Figure 20:
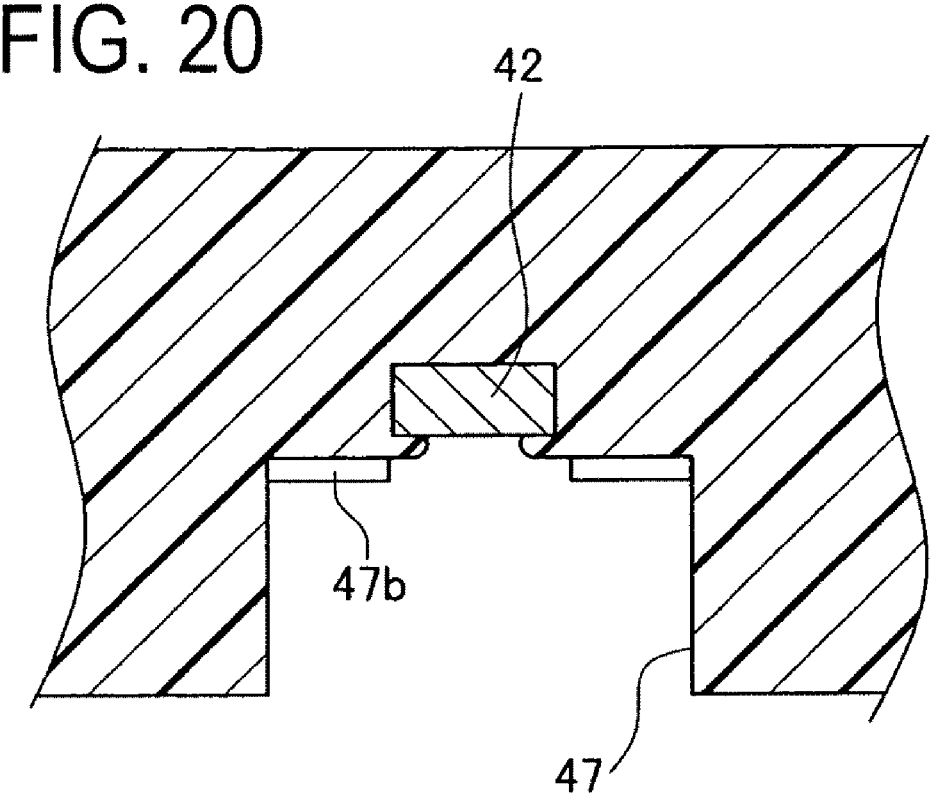
FIG. 20 is a cross sectional view showing a state where the connecting wire is mounted in the body in the eleventh embodiment taken along a line G-G in FIG. 17.

FIG. 18 is a view showing a state where the connecting wire is mounted in the body taken in a direction of an arrow F in FIG. 17. FIG. 19 is a view showing a state where the connecting wire mounted in the body is heat welded. FIG. 20 is a cross sectional view showing a state where the connecting wire is mounted in the body taken along a line D-D in FIG. 17 or FIG. 19.

After the connecting wire 42 is inserted and positioned in the groove 47a formed in the rotor body 21 or the stator body 31, for instance a circular heat-welding head not shown is pressed against such as a heat-welding element 47b to thermally deform part of the rotor body 21 or the stator body 31 as shown in FIG. 19, thereby welding the connecting wire 42 to the body 21 or 31. As shown in FIG. 20, the material of the body 21 or 31 flows out onto the connecting wire 42. Thus, the connecting wire 42 can be held by the body 21 or 31.

Twelfth Embodiment

Figure 21:
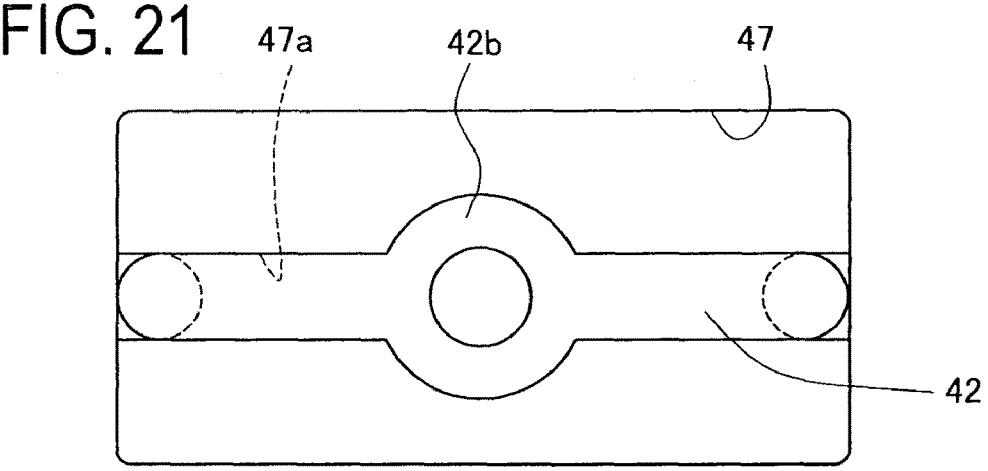
FIG. 21 is a view showing a state where a connecting wire is mounted in a body in a twelfth embodiment, taken in the direction of an arrow F.
Figure 22:
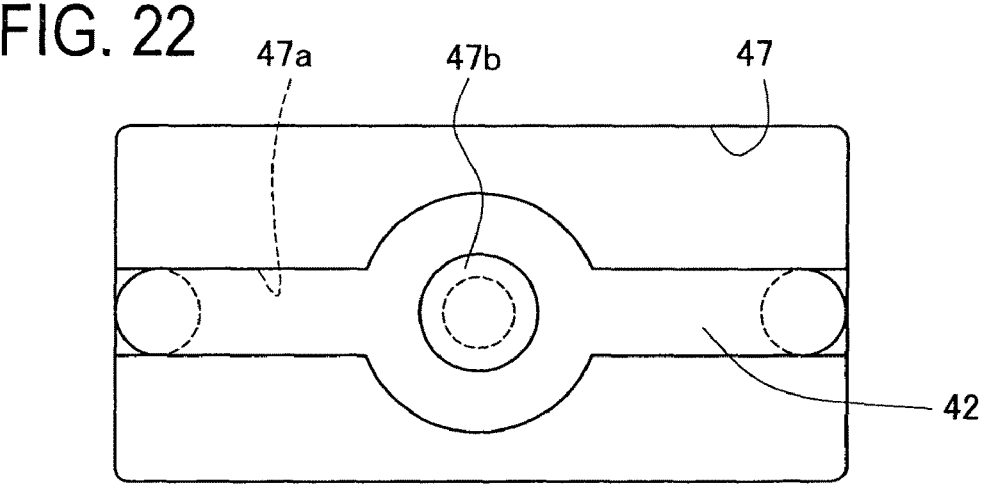
FIG. 22 is a view showing a state where the connecting wire mounted in the body is heat-welded in the twelfth embodiment.
Figure 23:
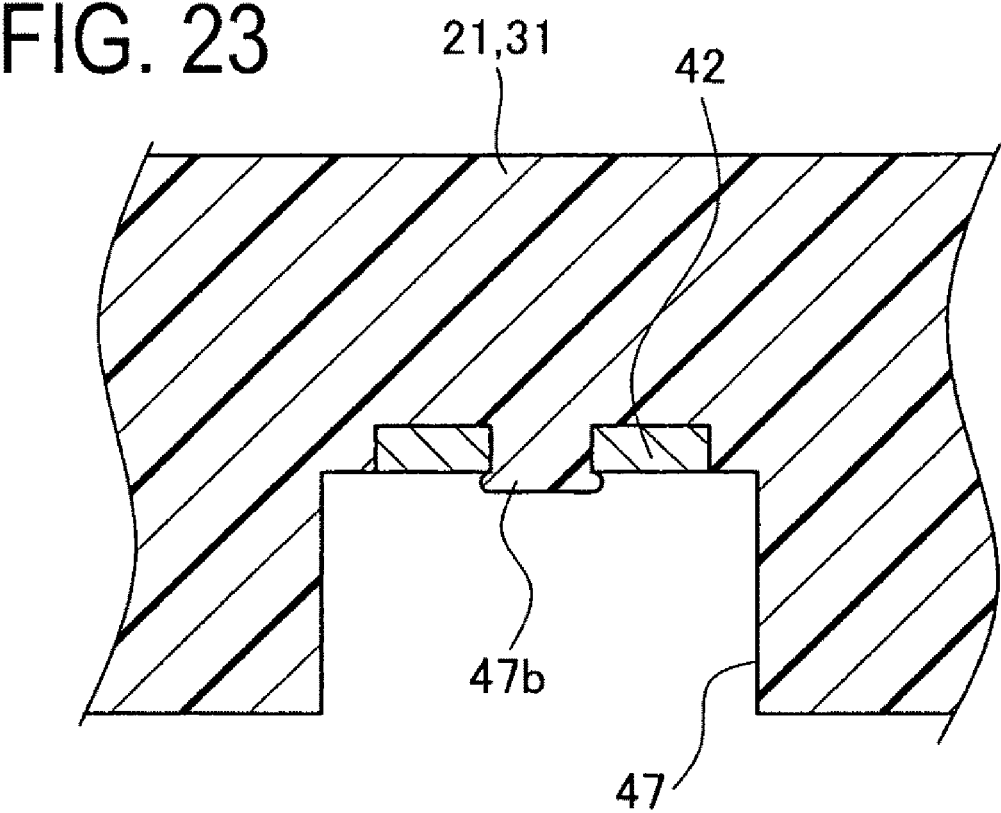
FIG. 23 is a cross sectional view showing a state where the connecting wire is mounted in the body in the twelfth embodiment.

A twelfth embodiment will be described below. The configuration in the twelfth embodiment is first explained. The twelfth embodiment is almost identical in configuration to the eleventh embodiment excepting a method of fixing the connecting wire 42. The following explanation is given to the differences. FIG. 21 is a view showing a state where a connecting wire is mounted in a body in the twelfth embodiment, corresponding to FIG. 18. FIG. 22 shows a state where the connecting wire mounted in the body is heat-welded, corresponding to FIG. 19. FIG. 23 is a cross sectional view showing a state where the connecting wire is mounted in the body, corresponding to FIG. 20.

FIG. 21 shows a state where a connecting wire 42 is inserted in a groove 47a formed in each of a rotor body 21 and a stator body 31. The connecting wire 42 in the twelfth embodiment is different in shape from the connecting wire 42 in the eleventh embodiment. Specifically, in the twelfth embodiment, an annular welding portion 42b is formed in the center of the connecting wire 42.

On the other hand, a heat-welding portion 47b protruding in cylindrical form in a back-side opening 47. When the connecting wire 42 is inserted in the body 21 or 31, the heat-welding portion 47b is inserted in a center hole formed in the annular welding portion 42b.

The heat-welding portion 47b is thermally deformed by a heat-welding head not shown. Thus, the connecting wire 42 can be fixed to each of the body 21 and 31 without dropping off therefrom.

The resolvers 100 in the eleventh and twelfth embodiments are examples of the method of holding the connecting wires 42 in the rotor body 21 and the stator body 31 without insert molding.

Differing from the method of insert-molding the connecting wires 42 in the rotor body 21 and the stator body 31, the configurations in the eleventh and twelfth embodiments needs a step of forming the back-side opening 47 and inserting the connecting wire 42 in the opening 47. Accordingly, the steps of forming the opening 47 and inserting the connecting wire 42 therein will slightly increase cost. However, it is considered to be effective in the circumstances where insert molding is not available. For instance, such circumstances may include a case where the connecting wire 42 may interfere with the detection coil back core 25 in the rotor body 21 and the excitation coil back core 35 in the stator body 31 and a case where the insert molding could not be applied to the rotor body 21 or the stator body 31 due to the material thereof.

Thirteenth Embodiment

A thirteenth embodiment will be described below. The configuration in the thirteenth embodiment is first explained. The thirteenth embodiment is almost identical in configuration to the first embodiment excepting patterns of a resolver rotor 20. The following explanation is therefore given to the differences.

Figure 24:
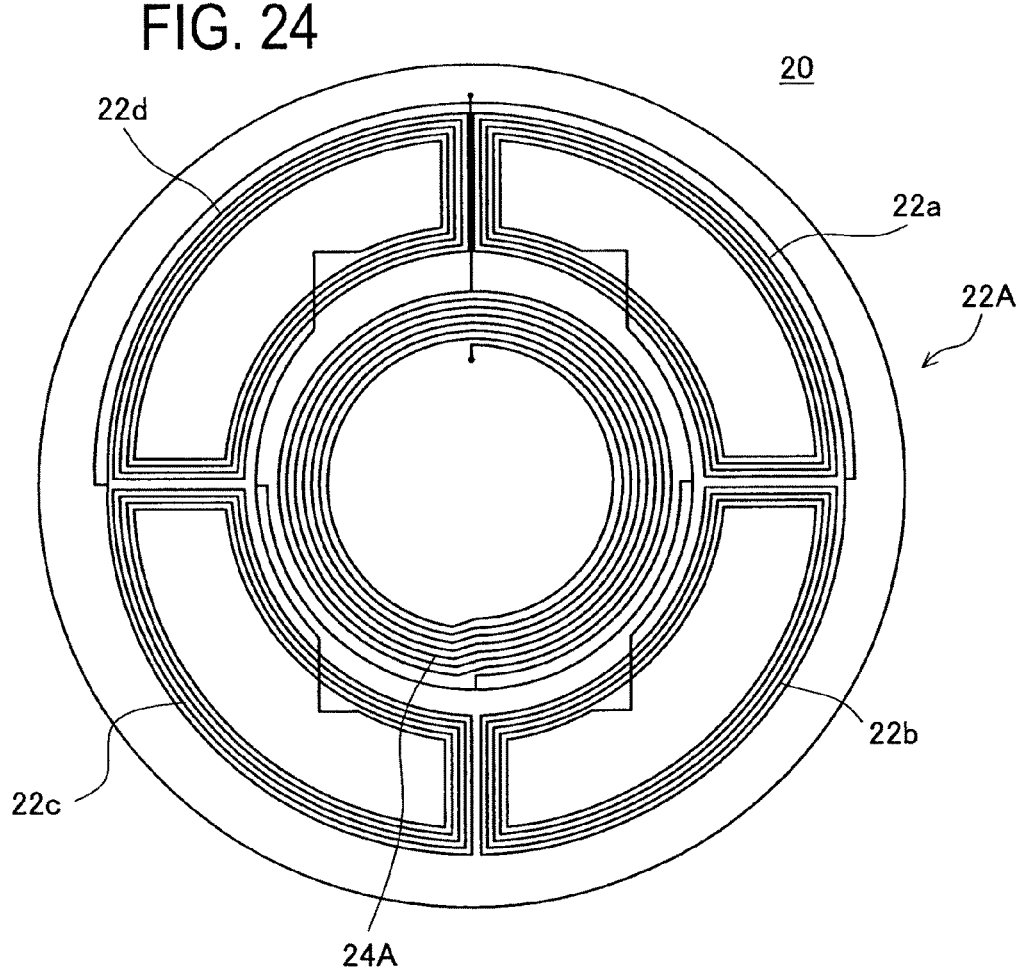
FIG. 24 is a diagram showing a rotor-side coil pattern of a resolver in a thirteenth embodiment.

FIG. 24 shows rotor-side coil patterns of a resolver. A resolver 100 in this embodiment is a 2× resolver. Accordingly, a detection coil pattern 22A is configured such that four coils, i.e., a first detection coil 22a, a second detection coil 22b, a third detection coil 22c, and a fourth detection coil 22d, are connected in parallel, and further connected to a rotary transformer pattern 24A.

The resolver rotor 20 includes a detection coil back core 25 and a rotary transformer back core 26 each insert-molded in a rotor body 21. The detection coil back core 25 is constituted of metal elements each having a slightly smaller width in a radial direction of the rotor 20 than the outside width between the outer circumference at the inside of the rotor 20 and the outer circumference at the outside of the rotor 20 of each coil forming the detection coil pattern 22A shown in FIG. 24. The metal elements are arranged in a circle corresponding to the detection coil 22.

The rotary transformer back core 26 is formed of an annular metal element having a slightly larger width than the rotary transformer pattern 24A shown in FIG. 24 and placed in correspondence with the rotor-side rotary transformer 24. Each back core is preferably made of a magnetic material such as iron, ferritic stainless steel, and resin containing iron powder.

The thirteenth embodiment having the above configuration can provide the following operations and advantages.

A first advantage is to increase the ampere turns of the resolver 100. The resolver 100 in this embodiment comprises the excitation coil 32 formed in flat plate shape and the detection coil 22 formed in flat plate shape. The resolver 100 for detecting angle information is configured such that the excitation coil 32 and the detection coil 22 are placed to face each other in spaced relation, specifically, at a predetermined distance G and be relatively movable. The detection coil 22 is constituted of the first to fourth detection coil elements 22a to 22d connected in parallel.

Figure 25:
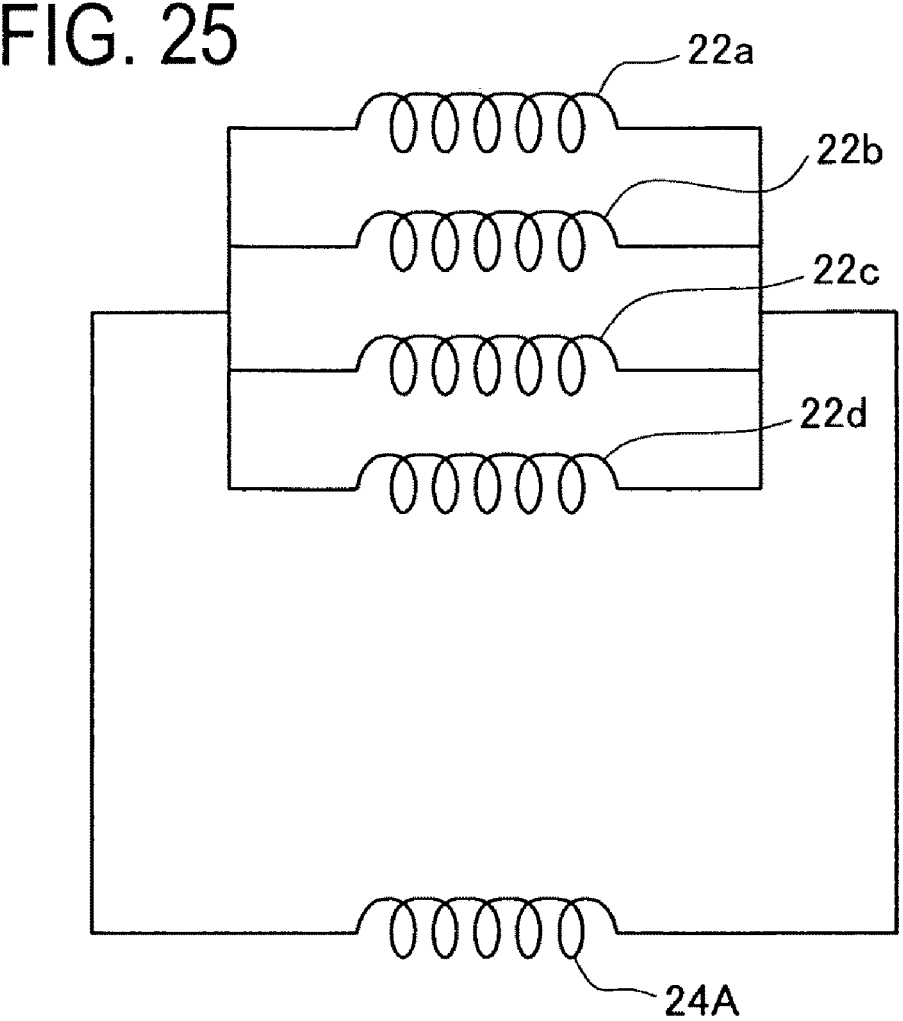
FIG. 25 is a connection diagram of detection coils in the thirteenth embodiment.

FIG. 25 is a connection diagram of the detection coil elements 22a to 22d. In the detection coil 22, the first to fourth detection coil elements 22a to 22d are connected in parallel and further connected to the rotary transformer pattern 24A.

The strength or intensity of a magnetic field is generally determined by multiplying a current flowing in a coil by the number of turns of the coil. However, the resolver 100 used in the motor 10 in this embodiment is configured for the purpose of size reduction and thickness reduction. Accordingly, the detection coil 22 and excitation coil 32 are drawn by ink jet.

Consequently, it is inevitable that the detection coil 22 and the excitation coil 32 each have a limited circuit thickness. In the case of forming a coil by ink jet, the thickness of the coil becomes about several μm when burned even if conductive ink is applied in a thickness of several tens μm. It is therefore difficult to provide a sufficient circuit thickness.

On the other hand, the wire or line width of the circuit also has a limitation and therefore the wire or line width has to be several hundreds μm. Otherwise, the number of turns could not be sufficiently provided. If it is attempted to make the wire or line width of the circuit thicker and provide the necessary number of turns, the diameter of the resolver 100 is consequently large. This goes against the demand for size reduction. Accordingly, each circuit forming the detection coil 22 or the excitation coil 32 could not have a sufficient cross sectional area and thus it is difficult to supply an adequate amount of current to each circuit.

In this embodiment, therefore, the first to fourth detection coil elements 22a to 22d of the detection coil 22 are connected in parallel, so that the detection coil 22 can produce sufficient ampere turns. Since the four coils are connected in parallel in this embodiment, substantively four times ampere turns can be obtained.

In the case where the first to fourth detection coil elements 22a to 22d are connected in parallel, the circuit resistance can be reduced one sixteenth of that in the case where the first to fourth detection coil elements 22a to 22d are connected in series. This is advantageous to a coil produced by ink jet whereby not providing the circuit with a sufficient cross sectional area and hence an adequate amount of current could not be supplied.

Another advantage is to provide a low-cost resolver 100. In the case of forming a coil by ink jet as mentioned above, the coil is unlikely to have a sufficient thickness due to the quality of conductive ink. It is also undesirable to increase the wire or line width in light of the demand for size reduction.

If a small-sized resolver 100 is formed with the detection coil 22 and the excitation coil 32 simply by ink jet, there is a case where a necessary amount of current for angle detection could not be supplied.

The excitation coil 32 and the detection coil 22 are placed apart at the predetermined distance G. Thus, if this distance G is made shorter, when the magnetic field output from the excitation coil 32 is detected by the detection coil 22, the strength or intensity of the detected magnetic field by the detection coil 22 is improved. However, the distance G has to be determined appropriately in consideration of the expansion of the rotor body 21 and the stator body 31 when the resolver 100 is mounted in the motor 10 and the prevention of interference for production accuracy. It is therefore difficult to shorten the distance G than is necessary.

However, the first to fourth detection coil elements 22a to 22d are connected in parallel to form the detection coil 22, so that the detection coil 22 can produce sufficient ampere turns, thereby enabling angle detection of the resolver 100. Since the resolver 100 can be provided with such coils as formed by ink jet, size reduction and thickness reduction can be achieved and further the production process can be simplified, thus leading to cost reduction.

The present invention is described above in the embodiments but not limited thereto. The invention may be embodied in other specific forms without departing from the essential characteristics thereof.

For instance, the constituent materials of the motor 10 in the first to thirteenth embodiments may be changed or modified.

The resolver 100 may be used for the purpose other than the detection of position of the motor 10.

For fixing the resolver rotor 20, any other methods than those explained in the first, third to fifth embodiments may be adopted. For fixing the resolver stator 30, similarly, any other methods than those explained in the first, sixth to eighth embodiments may be adopted.

While the presently preferred embodiment of the present invention has been shown and described, it is to be understood that this disclosure is for the purpose of illustration and that various changes and modifications may be made without departing from the scope of the invention as set forth in the appended claims.

The invention claimed is:

1. A resolver comprising:
a disc-shaped rotor provided with a planar tertiary coil and a planar rotor-side rotary transformer coil; and
a stator placed to concentrically face the disc-shaped rotor in an axial direction, the stator being formed in flat plate shape and provided with a planar primary coil, a planar secondary coil and a planar stator-side rotary transformer coil,
wherein the planar secondary coil is placed at a position displaced by 90 degrees in electrical angle with respect to the planar primary coil,
the planar primary coil and the planar secondary coil are placed to face the planar tertiary coil,
the planar rotor-side rotary transformer coil is placed to face the planar stator-side rotary transformer coil, and
the disc-shaped rotor is provided with a rotor back core made of a magnetic material and placed in a position corresponding to the planar tertiary coil and a rotary transformer back core placed in a position corresponding to the planar rotor-side rotary transformer coil, and the rotor back core and the rotary transformer back core are separated from each other in a radial direction of the disc-shaped rotor.

2. The resolver according to claim 1, wherein the stator is provided with a stator back core made of a magnetic material and placed in a position corresponding to the planar primary coil and the planar secondary coil.

3. The resolver according to claim 1, wherein the rotor back core is insert-molded in a body of the disc-shaped rotor.

4. The resolver according to claim 1, wherein a rotor mounting part for fixing the disc-shaped rotor is provided in a body of the disc-shaped rotor and the planar tertiary coil is formed of a conductive coating material with reference to a position of the rotor mounting part.

5. The resolver according to claim 1, wherein a stator mounting part for fixing the stator is provided in a body of the stator and the primary coil or the secondary coil is formed of a conductive coating material with reference to a position of the stator mounting part.

6. The resolver according to claim 1, wherein at least one of a body of the disc-shaped rotor and a body of the stator is made of insulating resin.

7. The resolver according to claim 1, wherein
at least one of the disc-shaped rotor and the stator has a body including a connecting wire connected to the planar coil or coils, and
the body has an end face in which a recess is formed around an end portion of the connecting wire to protrude from the body.

8. The resolver according to claim 1, wherein
the planar tertiary coil or each of the primary coil and the secondary coil is formed of at least two or more planar coils connected in parallel.

9. The resolver according to claim 1, wherein an insulation layer made of an insulating coating material is provided between the planar primary coil and the planar secondary coil.

10. A resolver comprising:
a rotor provided with a first coil and a first rotary transformer coil; and
a stator placed to concentrically face the rotor in an axial direction, and provided with a second coil, a third coil and a second rotary transformer coil,
wherein the third coil is placed at a position displaced by 90 degrees in electrical angle with respect to the second coil,
wherein the first, second and third coils, and the first and second rotary transformer coils are planar coils,
wherein the second and third coils are placed to face the first coil,
wherein the first rotary transformer coil is placed to face the second rotary transformer coil, and
wherein the rotor is provided with a rotor back core made of a magnetic material and placed in a position corresponding to the first coil and a rotary transformer back core placed in a position corresponding to the first rotary transformer coil, and the rotor back core and the rotary transformer back core are separated from each other in a radial direction of the rotor.

11. The resolver according to claim 10, wherein an insulation layer is provided between the second and third coils.

12. The resolver according to claim 10, wherein the rotor back core is insert-molded in a body of the rotor.

* * * * *